(12) United States Patent
Smith et al.

(10) Patent No.: US 7,357,099 B2
(45) Date of Patent: Apr. 15, 2008

(54) ANIMAL RESTRAINT APPARATUS AND METHOD OF USE

(75) Inventors: Greg Smith, Carmel, IN (US); Will Dodson, Lebanon, IN (US); Curt Nowaskie, Lebanon, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 691 days.

(21) Appl. No.: 10/411,836

(22) Filed: Apr. 11, 2003

(65) Prior Publication Data

US 2004/0025804 A1 Feb. 12, 2004

Related U.S. Application Data

(60) Provisional application No. 60/372,261, filed on Apr. 11, 2002.

(51) Int. Cl.
*A01K 27/00* (2006.01)
*A01K 29/00* (2006.01)

(52) U.S. Cl. .................. 119/771; 119/856; 119/792; 182/3

(58) Field of Classification Search ........ 119/769–771, 119/786, 772, 856, 863, 783, 725, 728; 297/483, 297/484, 468, 485; 182/3, 4, 9; 244/142, 244/151 R; 54/20, 58
See application file for complete search history.

(56) References Cited

U.S. PATENT DOCUMENTS

| | | | | |
|---|---|---|---|---|
| 2,187,021 A | * | 1/1940 | Everson | 119/792 |
| 2,212,746 A | * | 8/1940 | Nunn | 119/770 |
| 2,979,028 A | * | 4/1961 | Zakely | 182/3 |
| 3,757,744 A | * | 9/1973 | Pravaz | 182/3 |
| 4,099,778 A | * | 7/1978 | Lehr | 297/472 |
| 4,483,275 A | * | 11/1984 | De Groot | 119/793 |
| D293,139 S | * | 12/1987 | Roa | D30/152 |
| 4,715,618 A | * | 12/1987 | Harris | 119/771 |
| 4,927,211 A | * | 5/1990 | Bolcerek | 297/465 |
| 4,991,689 A | * | 2/1991 | Cole | 182/3 |
| 5,146,875 A | * | 9/1992 | Bolt | 119/654 |
| 5,154,660 A | * | 10/1992 | Snyder et al. | 119/771 |
| 5,203,829 A | * | 4/1993 | Fisk et al. | 119/857 |
| 5,247,905 A | | 9/1993 | Arakawa | |
| 5,335,627 A | * | 8/1994 | Bandimere | 119/856 |
| 5,427,061 A | * | 6/1995 | McCullough | 119/771 |
| 5,443,037 A | * | 8/1995 | Saleme | 119/771 |
| 5,540,403 A | * | 7/1996 | Standley | 244/122 B |

(Continued)

OTHER PUBLICATIONS

PCT Notification of Transmittal of the International Search Report or the Declaration dated Oct. 6, 2004 (1 sheet).

(Continued)

*Primary Examiner*—Bret Hayes
(74) *Attorney, Agent, or Firm*—Barnes & Thornburg LLP

(57) ABSTRACT

An animal restraint apparatus is provided to restrain an animal. The restraint apparatus comprises a first loop that fits over the animal's head and a second loop that is formed about the animal's torso when two straps are routed behind the animal's forelegs and releasably connected to a connecting assembly. The connecting assembly is equipped with at least one anchor member that releasably connects with a restraint member. The restraint member may be freestanding such as a leash or it may be attached to an anchorage. A method of restraining an animal is also provided.

48 Claims, 14 Drawing Sheets

U.S. PATENT DOCUMENTS

| | | | |
|---|---|---|---|
| 5,613,467 A * | 3/1997 | Arakawa | 119/792 |
| 5,624,135 A * | 4/1997 | Symonds | 280/801.1 |
| 5,676,093 A * | 10/1997 | Sporn | 119/792 |
| 5,794,571 A * | 8/1998 | Goldberg | 119/792 |
| 5,839,965 A * | 11/1998 | Mullins | 472/118 |
| 5,913,285 A * | 6/1999 | Pritchard | 119/771 |
| 5,915,335 A * | 6/1999 | Holt, Jr. | 119/771 |
| 5,957,091 A * | 9/1999 | McDonald et al. | 119/770 |
| 6,006,700 A * | 12/1999 | Cox | 119/857 |
| D424,761 S * | 5/2000 | Mortenson | D30/152 |
| 6,101,979 A * | 8/2000 | Wilson et al. | 119/725 |
| 6,109,698 A * | 8/2000 | Perez | 297/484 |
| 6,125,966 A * | 10/2000 | Jones | 182/3 |
| 6,161,505 A * | 12/2000 | Noguero | 119/792 |
| 6,253,874 B1 * | 7/2001 | Casebolt et al. | 182/3 |
| 6,364,417 B1 * | 4/2002 | Silverman | 297/464 |
| 6,387,465 B1 * | 5/2002 | Yuan et al. | 428/58 |
| 6,405,685 B1 * | 6/2002 | Cox | 119/857 |
| 6,450,130 B1 * | 9/2002 | Goldberg | 119/792 |
| 6,467,851 B1 * | 10/2002 | Mannell et al. | 297/484 |
| 6,543,390 B2 * | 4/2003 | Lowery | 119/771 |
| 6,637,377 B2 * | 10/2003 | Lobanoff et al. | 119/792 |
| 2003/0010567 A1 * | 1/2003 | Gayetty | 182/3 |

OTHER PUBLICATIONS

PCT International Search Report dated Oct. 6, 2004 (3 sheets).

* cited by examiner

ANIMAL RESTRAINT APPARATUS AND METHOD OF USE

This application claims priority to, and the benefit of U.S. provisional patent application No. 60/372,261, filed Apr. 11, 2002, the disclosure of which is now incorporated herein by reference.

BACKGROUND AND SUMMARY OF INVENTION

This invention relates to animal restraining devices for use in a vehicle, and more particularly to an animal restraint configured to secure the animal through the use of round-bars or tie bars, as well as seat belts, as well as a stand-alone leash.

Animal restraint devices comprising a harness with straps extending therefrom to secure the harness to a vehicle through the use of the vehicle's existing human seatbelt system are known. Such conventional devices typically utilize one of several configurations to secure the harness. For example, the restraint may be configured such that the vehicle's web belt slides through a loop on the harness to secure the harness to the vehicle. Such a configuration is disclosed in U.S. Pat. No. 5,794,571. In another example, a tether extends from the harness and has at one end a seat belt tongue lockingly insertable into the vehicle's belt buckle in order to secure the harness. An example of this second configuration is disclosed in U.S. Pat. No. 5,154,660. Each of these conventional configurations make use of the vehicle's human seatbelt system, but the harnesses themselves do not use human-quality seatbelt components. Also, the harnesses present some difficulty when being placed on an animal.

The federal government has mandated that child restraint anchorage systems be installed in most vehicles, including cars, trucks, and certain school buses. These regulations known as Federal Motor Vehicle Safety Standards (FMVSS), codified at 49 C.F.R. § 571.225 (FMVSS 225), incorporated herein by reference, require two lower anchorages, or round-bars, and an upper tether anchorage of specified configuration, location and strength parameters. Similarly, 49 C.F.R. § 571.213 (FMVSS 213), incorporated herein by reference, specifies the dimensions of tether hooks used to attach a tether strap to a tether anchorage. Disclosed herein are animal and kennel restraint systems configured to mount to vehicles using anchorages and connectors compatible with 49 C.F.R. §§ 571.225 and 571.213 as appropriate. Also disclosed is a method of restraining an animal.

What is provided is a restraint system incorporating enhanced safety features that is relatively easy to put onto an animal, or a kennel containing an animal, and is relatively easy to connect and disconnect from the vehicle. Such a system may use commercial quality belts, buckles, tongues, adjusters and connectors. Such a system may also provide comfortable chest, shoulder, neck and back support for an animal.

In one illustrative embodiment, an animal restraint apparatus is provided comprising a connecting assembly configured for coupling to a restraint member. The apparatus further comprises a first length of web extending from the connecting assembly and having a first free end releasably connectable to the connecting assembly and a second length of web extending from the connecting assembly and having a second free end releasably connectable to the connecting assembly. The restraint apparatus is configured to be secured to an animal with the first and second free ends releasably connected to the connecting assembly and the first length of web crossing the second length of web. The connecting assembly may comprise one or more anchor members, such as for example D-rings, loops of web, and tongues. The illustrative embodiment may further comprise one or more connectors, such as tongues, configured to releasably engage at least one connector, such as a buckle, carried by the connecting assembly. The first and second lengths of web extend away from the connecting assembly and slidingly through a junction member to define an adjustable loop configured to fit over an animal's head. The first and second lengths of web continue to extend away from the junction member. The free ends of the first and second lengths of web are attached to the tongues, which when releasably engaged with the one or more buckle on the connecting assembly construct a second adjustable loop. The fit of the adjustable loops may be adjusted by the moveable junction member alone or in combination with one or more web adjusters slidingly mounted to the first and second lengths of web. The illustrative embodiment may further comprise a securement assembly to couple together the first and second lengths of web if desired. The illustrative embodiment is configured to releasbly couple with a restraint member, which may be for example a tether, a leash, or a seat belt system. The tether or leash may comprise animal restraint couplings such as for example snap hooks, swivel hooks and mini-connectors, or they may tie directly to the connecting assembly. The tether and leash may also comprise vehicle restraint couplings such as snap hooks, swivel hooks and mini-connectors to releasably couple the restraint member to anchorages attached to a vehicle. Such anchorages may be round bars or seat belts. Human quality belts, webs, buckles, tongues, and couplings may be used in the embodiment.

Another illustrative animal restraint apparatus is provided and comprises a container restraint apparatus comprising a first length of web comprising a first end having a first coupling device, and a second end having a second coupling device. The container restraint apparatus is configured to secure to a vehicle a container. The container may be configured for holding an animal. Moreover, the restraint apparatus may secure the container to the vehicle by coupling with an anchorage attached to the vehicle.

A further illustrative animal restraint apparatus is provided and comprises a length of web having opposing ends, a first coupling attached to the first opposing end, and a second coupling attached to the second opposing end. The first coupling may be configured to releasably connect to a restraint device worn by the animal, and the second coupling may be configured to releasably connect to an anchorage attached to a vehicle.

Yet another illustrative embodiment is provided of an animal restraint apparatus comprising a connecting assembly configured for coupling to a restraint member. The connecting assembly comprises a first connecting member extending from a first side of the connecting assembly and a second connecting member extending from a second side of the connecting assembly opposite the first side. The embodiment further comprises a first length of web extending from the first side of the connecting assembly and having a first free end releasably connectable to the second connecting member; and a second length of web extending from the second side of the connecting assembly and having a second free end releasably connectable to the first connecting member. The restraint apparatus is configured to be secured to an animal with the first and second free ends releasably connected to the connecting assembly. The fit of the apparatus is adjustable on the animal by use of one or more web adjusters.

An illustrative method of restraining an animal is provided comprising the steps of placing a first loop of webbing over the head of an animal, forming a second loop of webbing adjacent to the first loop by releasably connecting to a connecting assembly a first and a second length of web about the animal's torso behind its forelegs, and connecting a restraint member to the connecting assembly.

DETAILED DESCRIPTION OF THE DRAWINGS

Figure 1:
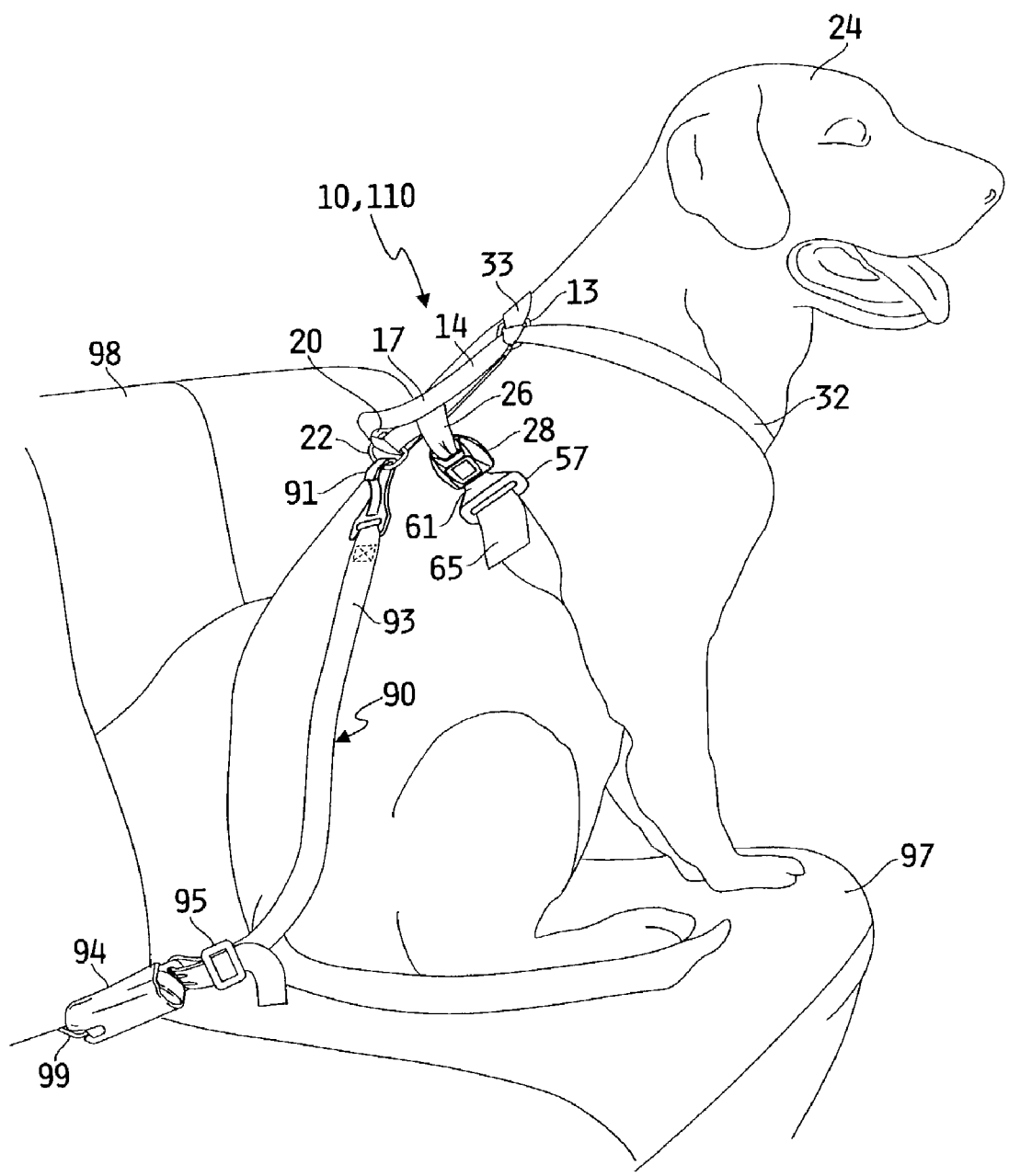
FIG. 1 is a perspective view of an animal restrained in a vehicle by an illustrative embodiment of the present invention.

For the purposes of promoting an understanding of the principles of the invention, reference will now be made to a number of illustrative embodiments depicted in the drawings and specific language will be used to describe the same. It will nevertheless be understood that no limitation of the scope of the invention is thereby intended.

FIGS. 1 through 22 depict illustrative embodiments of animal restraint apparatus or systems 10, 110, 210a, 210b, 310, 410, 510, 610, 90, 190, 290, 390, 490, and 590, which will be described now in detail. For ease of reference, the same reference numbers will be used to refer to components common throughout the various embodiments. Animal restraint apparatuses 10, 110, 310, 410, 510, 610, each comprise generally a connecting assembly 14 joined to a permanent and adjustable loop 11, and an adjacent constructable loop 12, as will now be explained.

Figure 8:
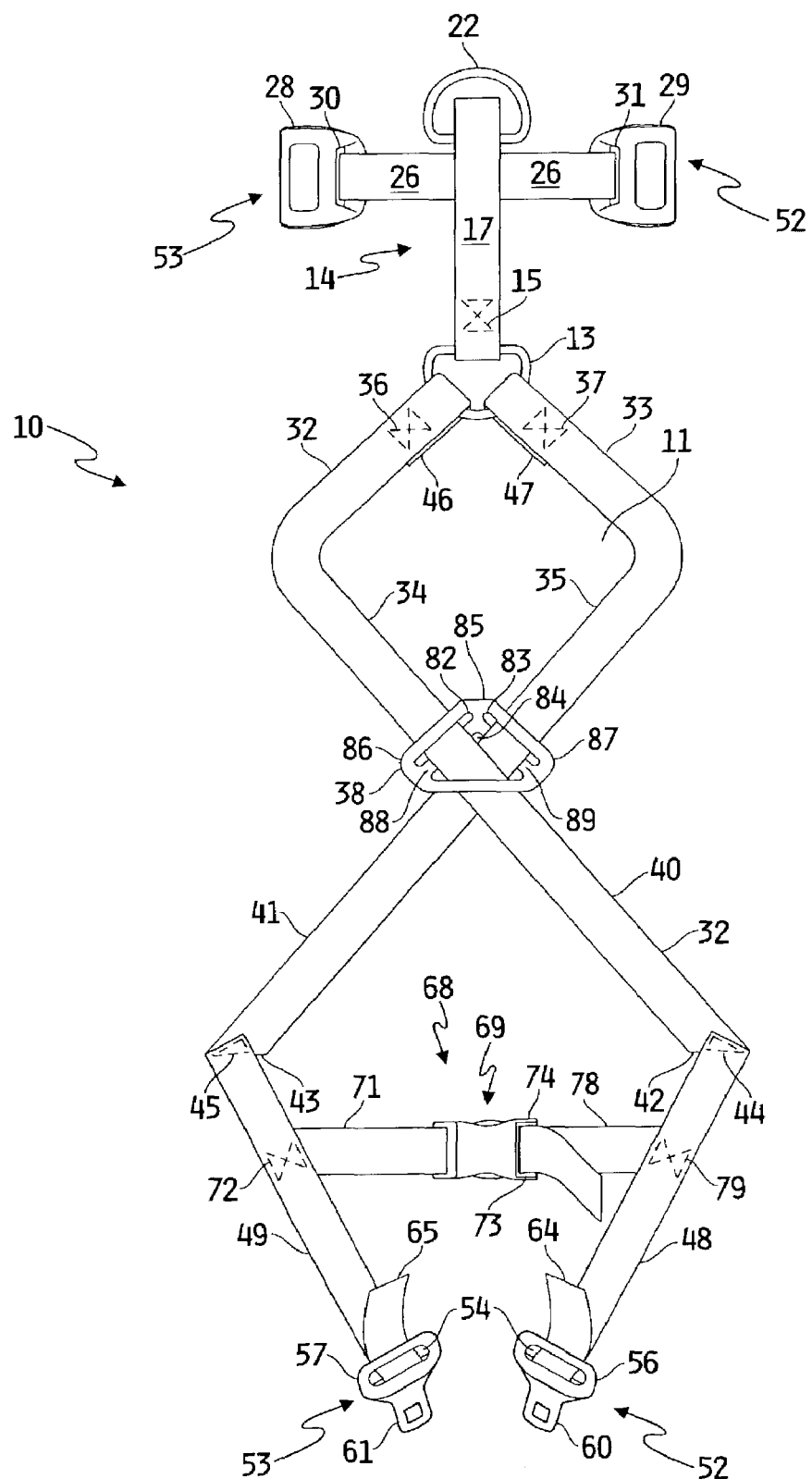
FIG. 8 is a top plan view of the illustrative embodiment of FIG. 2.
Figure 9:
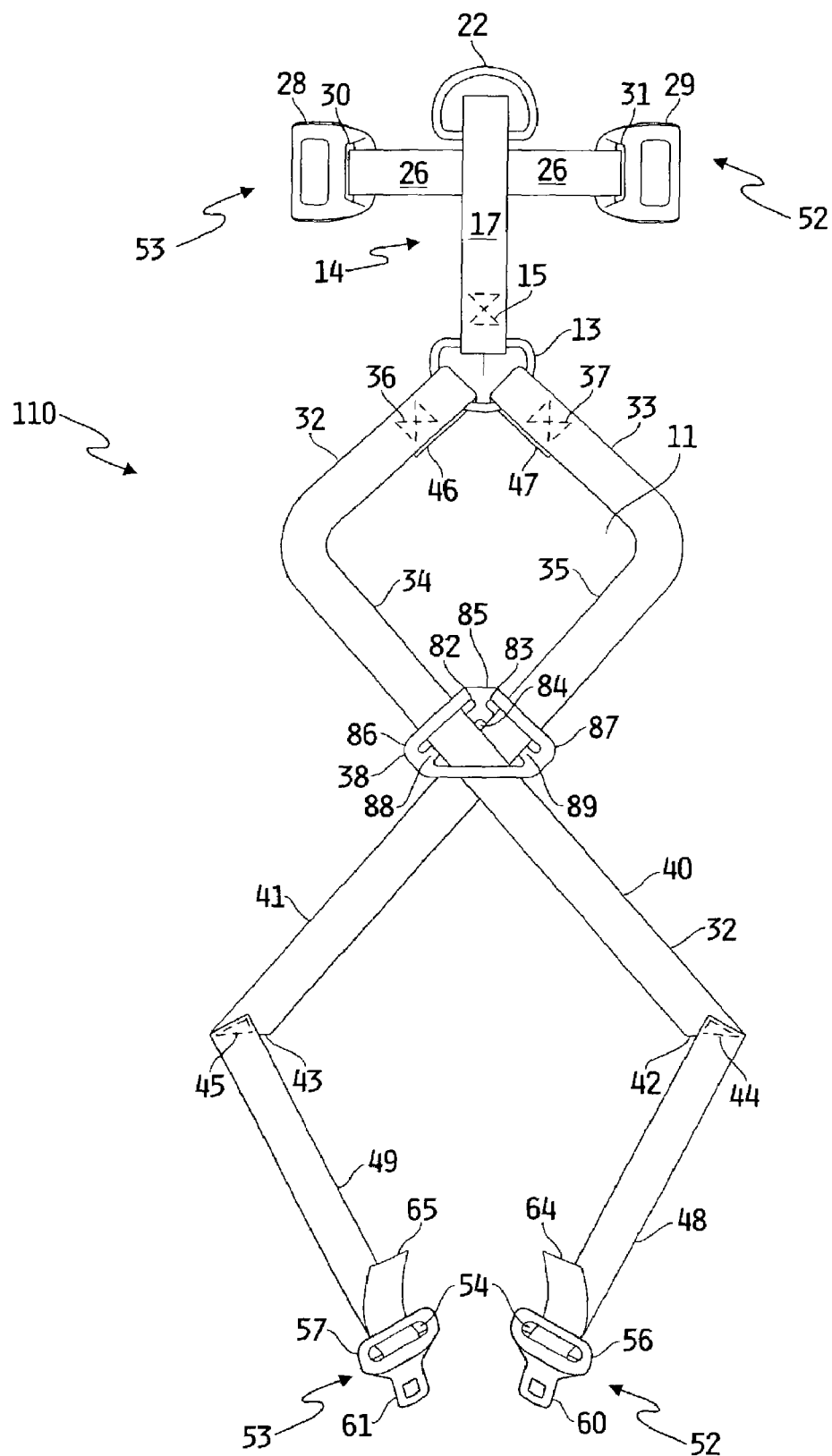
FIG. 9 is a top plan view of the illustrative embodiment of FIGS. 1, 3.
Figure 10:
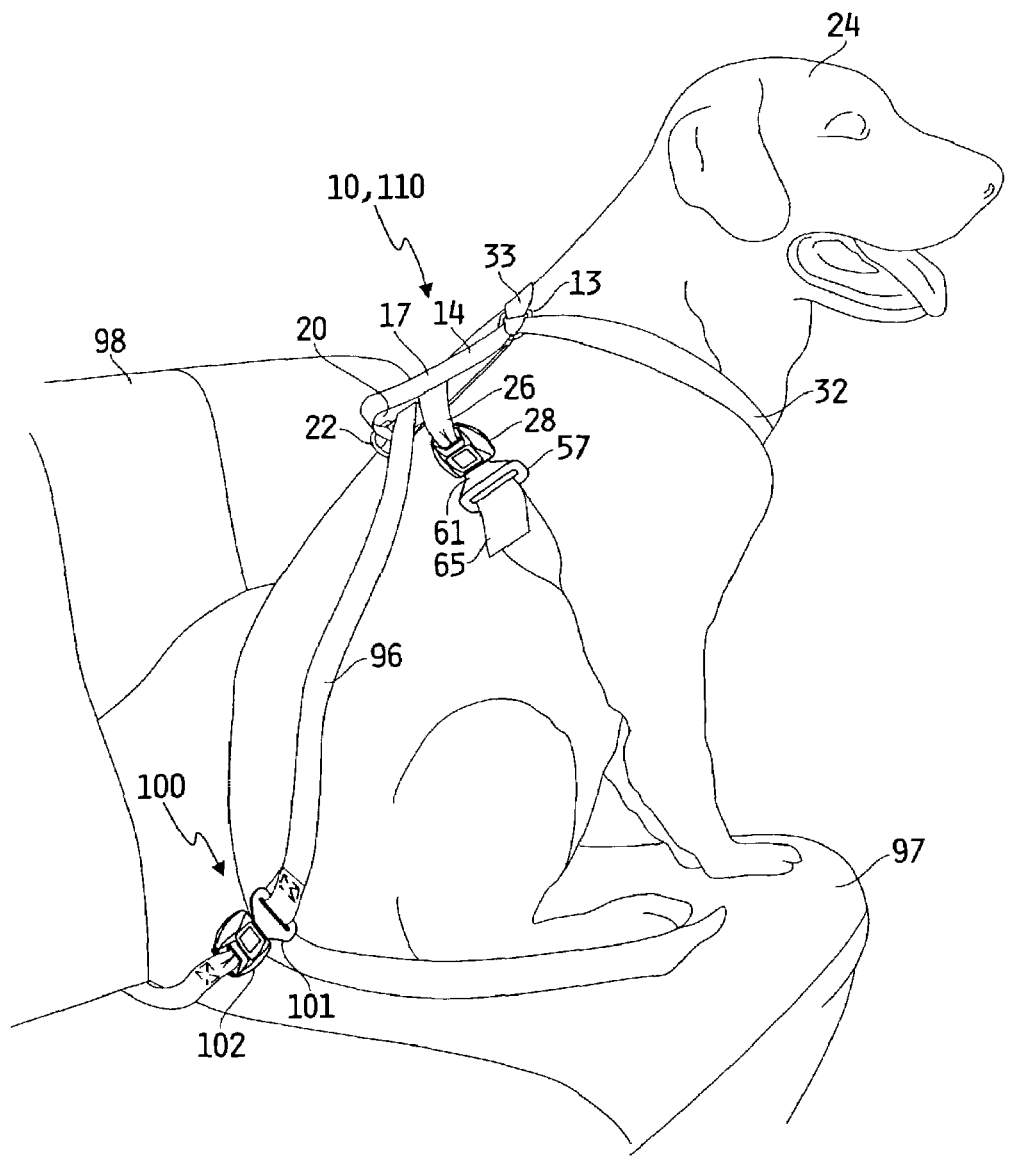
FIG. 10 is a perspective view of an animal restrained in a vehicle by another illustrative embodiment of the present invention.
Figure 11:
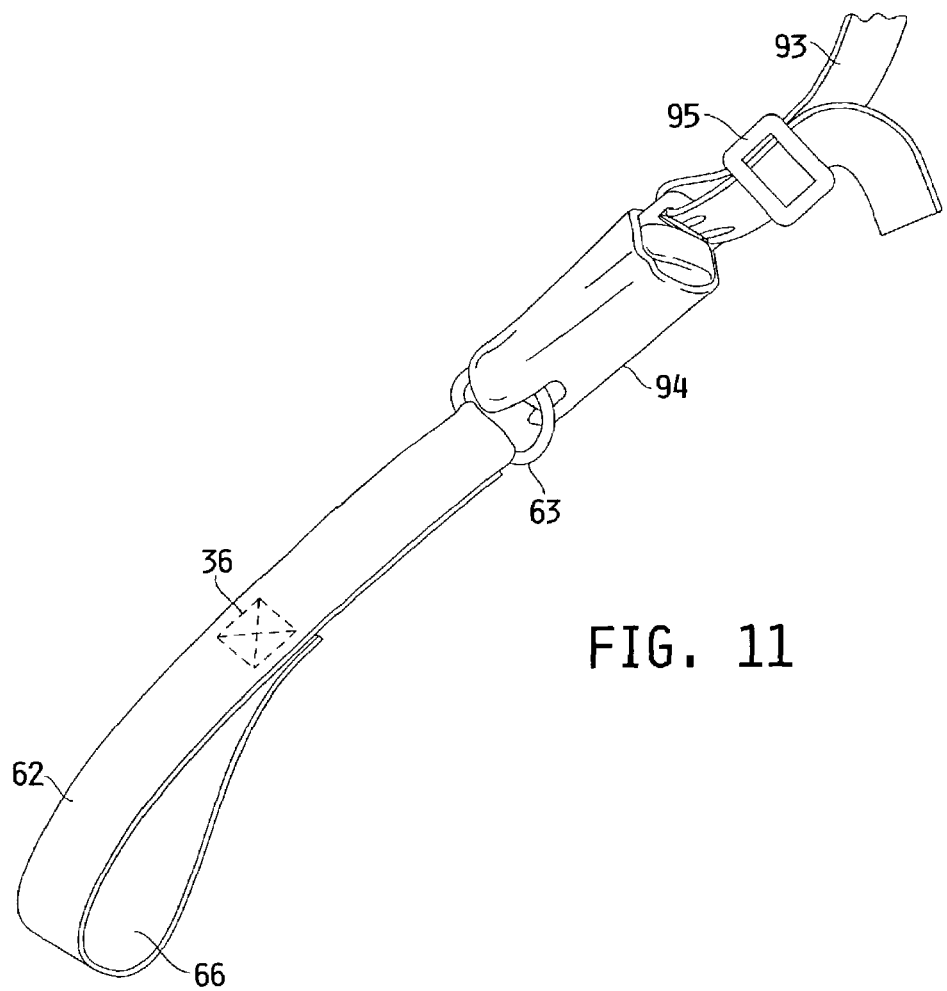
FIG. 11 is a perspective view of another illustrative restraint apparatus.
Figure 17:
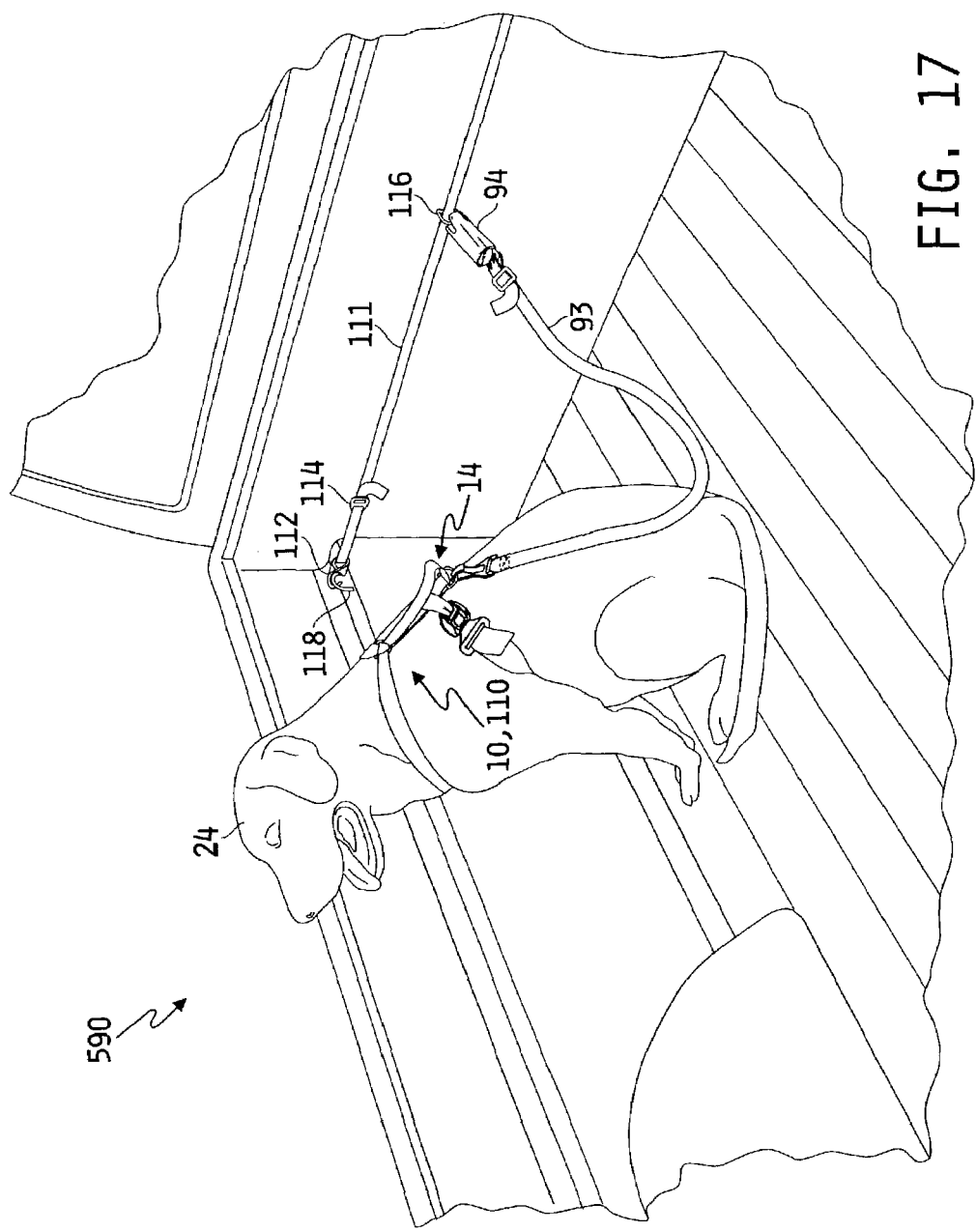
FIG. 17 is a partial perspective view of an animal restrained in a vehicle by another illustrative animal restraint system.

Illustrative embodiments 10, 110 of the animal restraint apparatus are depicted in a deconstructed configuration in FIGS. 8 and 9 and illustratively depicted in a constructed configuration in FIGS. 1, 2, 3, 10 and 17. FIGS. 1, 10 and 17, show the illustrative embodiments 10, 110 being worn by an animal 24. As best seen in FIGS. 8 and 9, a first length of web 32 and a second length of web 33 each extend away from connecting assembly 14. The connecting assembly 14 generally comprises anchor members 13, 20 and 22 configured for coupling to any of a number of restraint members or systems, and one or more coupling devices, illustratively conventional buckles 28 and 29. Connecting member or mounting component 14 further comprises one or more linking pieces of generally flexible connecting material, such as for example webbing, plastic, chord, rope, rubber and the like. For example, in illustrative embodiments 10 and 110 linking pieces 17 and 26 may comprise webbing.

Illustratively, anchor members 13 and 22 are metal D-rings, although other suitable structures of other suitable compositions may be used. For example, the anchor members 13, 22, may be ovate, circular, square, diamond shaped, or other suitable polygonal shape, and may be fashioned out of metallic, non-metallic, or composite materials such as plastic, brass, zinc, hardened resin, polymers and the like. The opposite ends (not shown) of linking web 26 pass through apertures 30 and 31 respectively formed in each of buckles 28 and 29, loop back toward and meet or overlap each other in order to link the buckles 28 and 29 with each other. The opposite ends are secured by for example stitching 16 (FIG. 3) or other suitable method such as gluing, melting, tacking and the like. Linking web 17 similarly links together anchor members 13 and 22 as follows. One end of web 17 underlies web 26 and is connected thereto by the stitching 16. The other end of web 17 is threaded through anchor member 22 and loops back therethrough and over the top of web 26, continuing away from anchor member 22 and toward anchor member 13. The stitching 16 passes in sequence through the looped back portion of web 17, through the looped-back opposite ends of web 26, through the portion of web 26 underlying its looped-back ends, and through the one end of web 17, thereby forming loop 18, which moveably retains anchor member 22. Continuing away from stitching 16, the other end of web 17 is threaded through and loops back around anchor member 13, continues away therefrom and back toward anchor member 22, threads through anchor member 22 and loops back around, passing under web 26 and continuing back toward anchor member 13. Stitching 15 secures the looped back portions of web 17, forming loop 19, and the other end of web 17, forming anchor member 20. Loop 19 movably attaches anchor member 13 to the connecting assembly 14. The manner in which the webs 17 and 26 loop back need not be as just described. For example, numerous lengths of web or other suitable material may be used as opposed to just two webs 17, 26 looped back on each other. In any event, as will be explained, the loops and connections may be effected by other means such as by rivets, snaps, zippers, hook and loops, glue, heat seal, etc.

The first length of web 32 comprises first affixed end 46 movably attached to anchor member 13 and first free end 64 extending away therefrom. Similarly, second length of web 33 comprises second affixed end 47 movably attached to anchor member 13 in adjacent relationship to first affixed end 46, and second free end 65 extending away from anchor member 13. The respective first affixed ends 46 and 47 of first and second webs 32 and 33 are inserted through and folded around anchor member 13, looping back over themselves, and secured thereto, for example, as by stitching 36 and 37 or other suitable methods described herein. The looping attachment just described allows each affixed end 46 and 47 to move freely about and along the anchor member 13. It will be appreciated, that the affixed ends 46 and 47 may be more immovably attached to anchor member 13 and may be attached in overlaying or adjoining relationship one to the other. They may even be attached to each other. As the first and second free ends 64, 65 extend away from the connecting assembly 14 in general and the anchor member 13 in specific, they cross in order to define adjustable loop 11 extending between the connecting assembly 14 and a junction member 38 as will now be explained more fully.

The first and second lengths of web 32, 33 are slidingly received through junction member 38 in crossing relationship. The junction member or spreader 38 is generally triangular in shape and is slidably mounted on webs 32 and 33 thereby forming permanent and adjustable loop 11. Junction member 38 is provided with two inner cross pieces 88 and 89, each extending generally from the apex 85 obliquely away, one each respectively toward each of the opposite vertexes 86 and 87, thereby forming three apertures 82, 83, and 84. First free end 64 illustratively is threaded in succession through the bottom of spreader 38 up through aperture 82, over cross piece 88, and down through aperture 84. Second free end 65 is threaded in succession through the bottom of spreader 38 up through aperture 83, over cross piece 89, and down through aperture 84. As just described, and as best depicted in FIGS. 8, and 9, first length of web 32 crosses over second length of web 33 in aperture 84, which is defined as the general point of crossing. Alternatively, second length of web 33 could cross over first length of web 32 in aperture 84. Junction member 38 may be made from, for example, plastic or other suitable material. It may also comprise foam, neoprene or nylon mesh material and may be designed in size, shape and composition to support the animal and spread the load of the restraint apparatus on the animal. An example of one suitable junction member 38 is an A.C.W. manufactured by acculoc™ of Woonsocket, R. I. It will be appreciated that alternative junction members, or no junction member may be used. For example, the first and second lengths of web 32 and 33 may be crossed manually when put on an animal, in which case, loop 11 would also be constructable rather than permanent. Alternatively, first and second lengths of web 32 and 33 could be affixed together at the point of crossing.

From the point of crossing, the first and second lengths of web 32, 33 proceed away at a generally oblique angle from the junction member 38 toward folds 42 and 43, which may be permanently formed as by for example stitching 44, 45, and away at an oblique angle from folds 42 and 43, ending generally first and second free ends 64 and 65. It will be appreciated, however, that the folds 42 and 43 may be omitted altogether. Thus, first and second length of web 32 and 33 illustratively and generally comprise respective neck and shoulder area portions 34 and 35, chest area portions 40 and 41, and behind-the-leg area portions 48 and 49.

Figure 2:
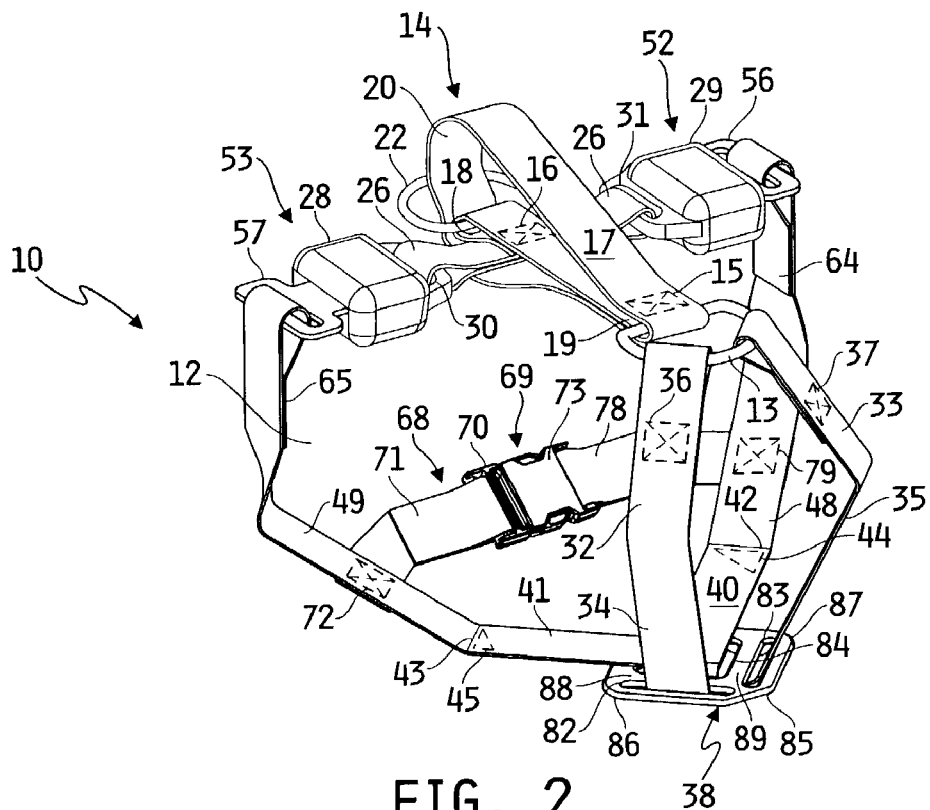
FIG. 2 is a perspective view of another illustrative embodiment of the animal restraint of the present invention.
Figure 3:
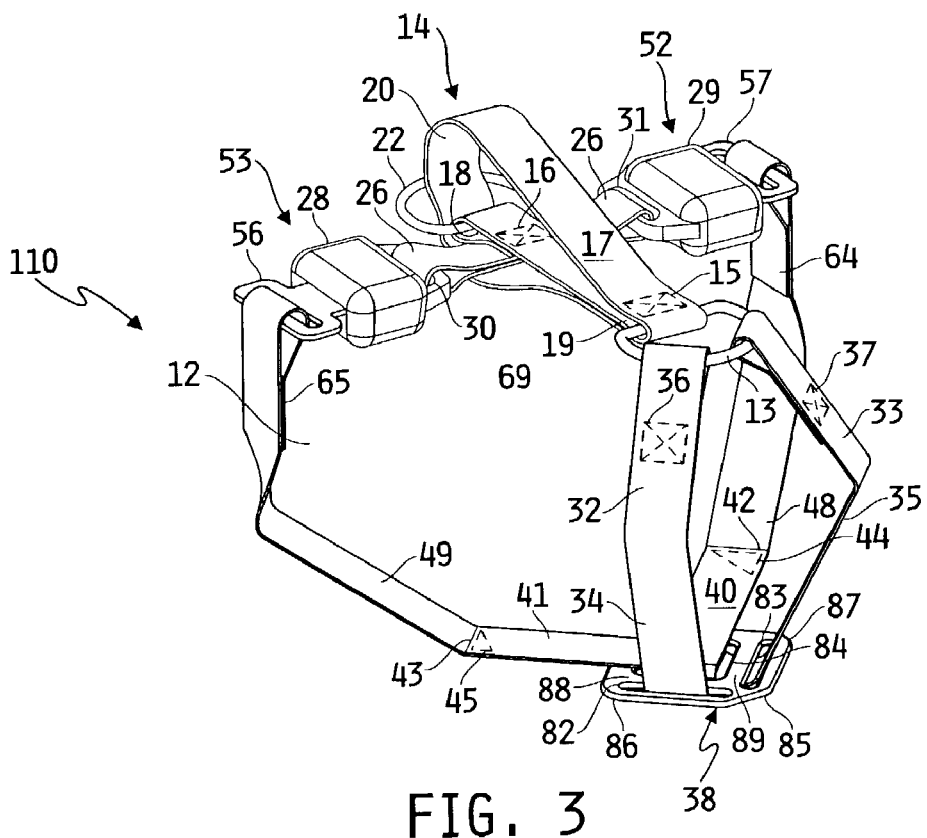
FIG. 3 is a perspective view of the illustrative embodiment of FIG. 1.
Figure 4:
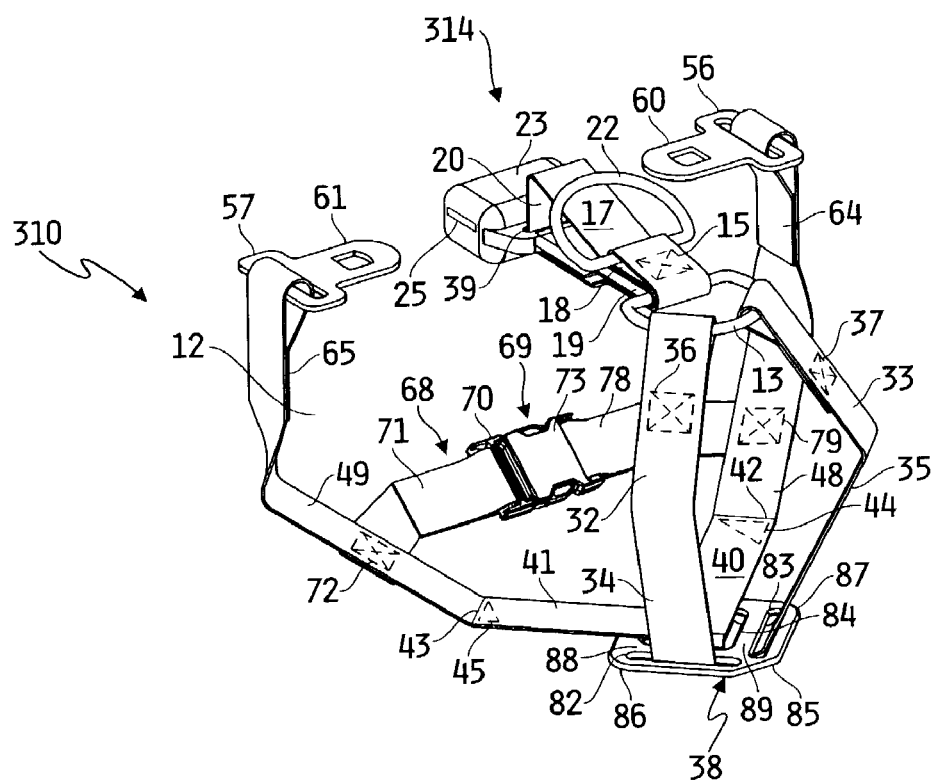
FIG. 4 is a perspective view of another illustrative embodiment of the animal restraint of the present invention.
Figure 5:
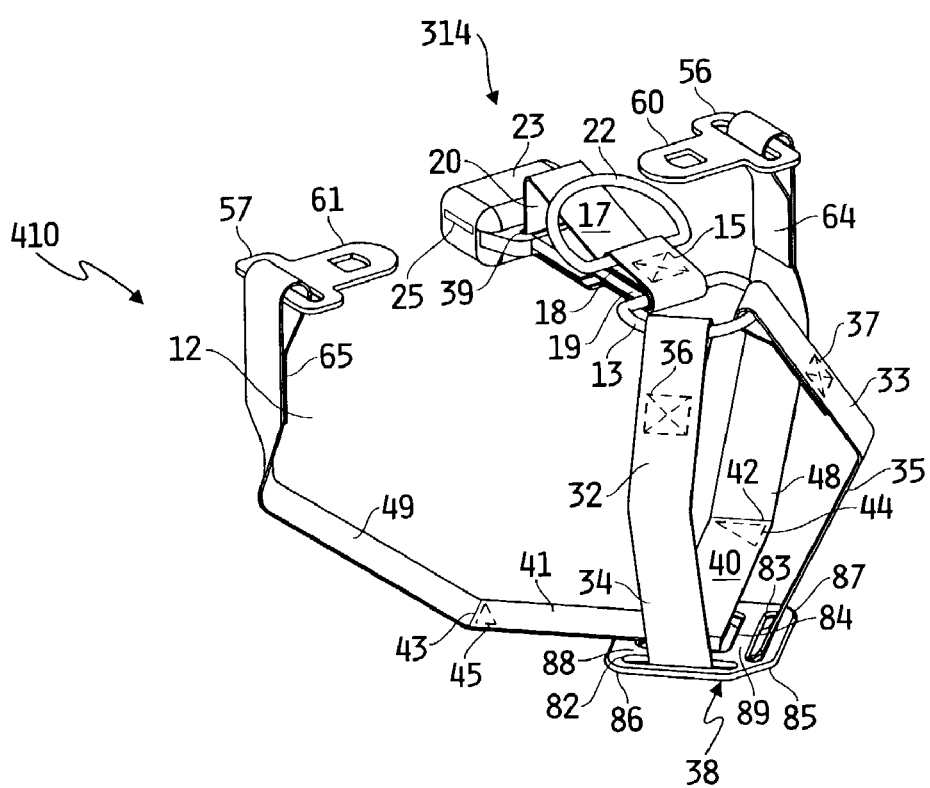
FIG. 5 is a perspective view of another illustrative embodiment of the animal restraint of the present invention.
Figure 6:
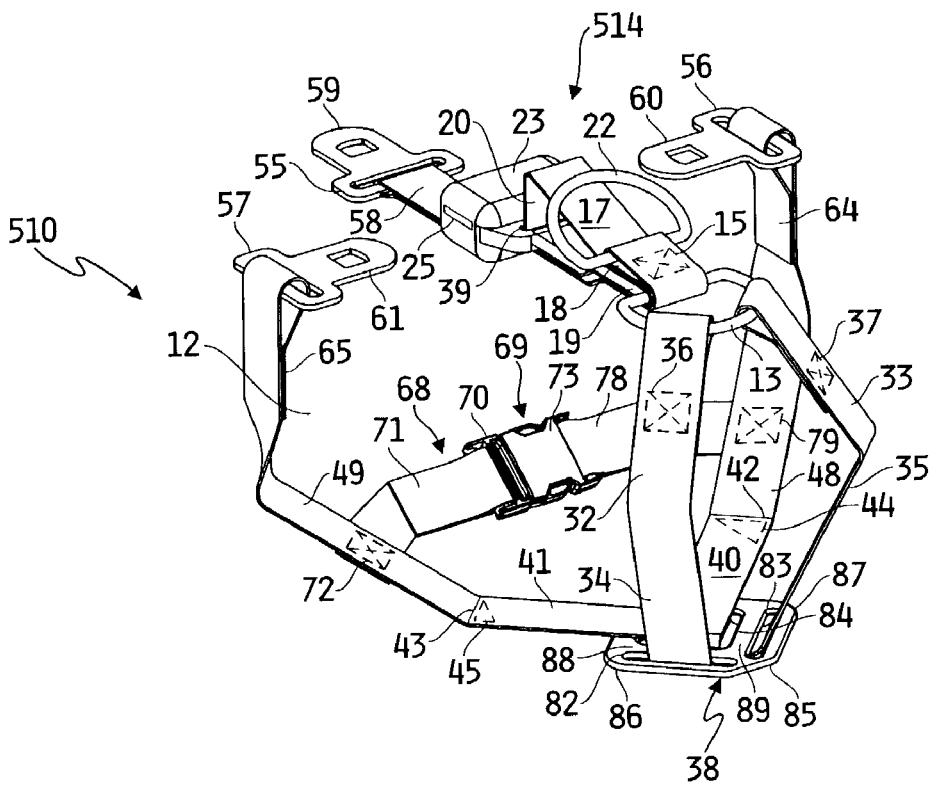
FIG. 6 is a perspective view of another illustrative embodiment of the animal restraint of the present invention.
Figure 7:
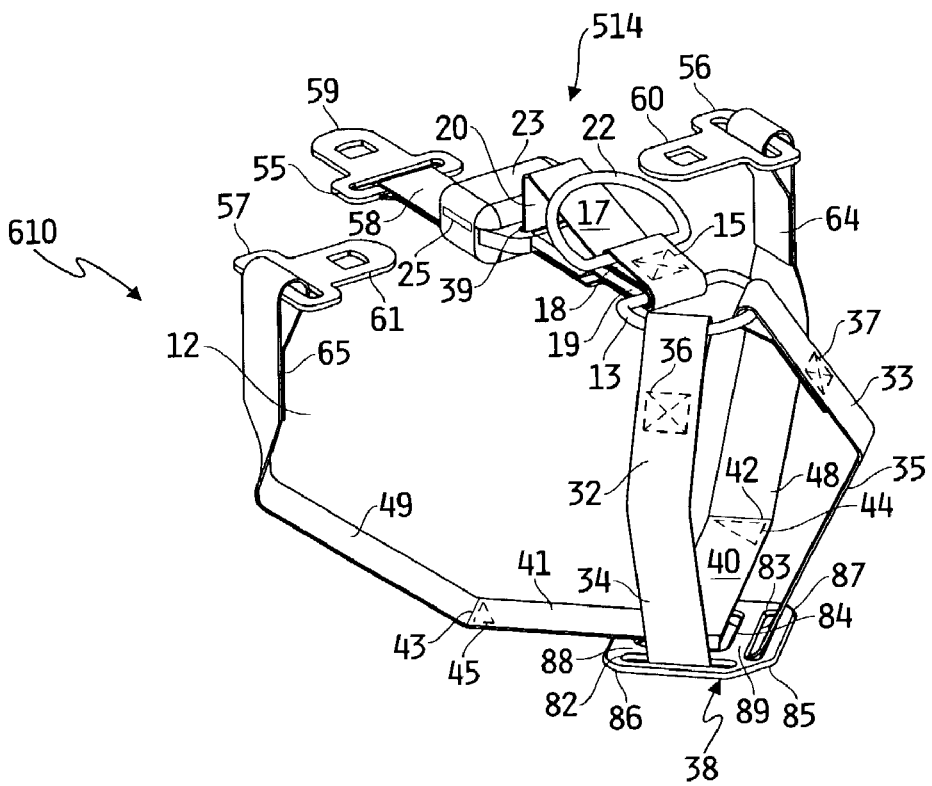
FIG. 7 is a perspective view of another illustrative embodiment of the animal restraint of the present invention.

The first and second free ends 64, 65 may remain free until releasably connected to the connecting assembly 14 to construct or form constructable loop 12 as best seen in FIGS. 2 and 3. While the first and second free ends 64, 65 may be releasably connected to the connecting assembly 14 by any suitable means, such as by tying first and second free ends 64 and 65 to one of the anchor members 13, 20, 22, the illustrative embodiments 10, 110 are, for example, equipped with connector assemblies 52 and 53. Connector assembly or coupling system 52 comprises adjuster 56, connector or tongue 60, and coupling device or buckle 29. Connector assembly or coupling system 53 comprises adjuster 57, connector or tongue 61, and coupling device or buckle 28. Each conventional tongue 60 and 61 is lockingly and releasably engageable with its respective buckle 29 and 28, which may be any conventional buckle including, for example, buckles disclosed in U.S. Pat. Nos. 4,425,688 and 4,617,795, the disclosures of which are incorporated herein by reference. As described above, buckles 28 and 29 are components of connecting assembly 14. Adjusters 56 and 57 are slidably mounted on webs 32 and 33 with their respective first and second free ends 64 and 65 threaded through the adjusters 56 and 57 and looped back therethrough. Although the adjusters 56 and 57 may be separate and apart from the tongues 60, 61, in the illustrative embodiments, combination tongue/adjusters 56/60 and 57/61 are provided and are known to those skilled in the art and comprise adjuster bar 54. In any event, when the free ends 64 and 65 are provided with any type of connector, such as tongues 60, 61, such connector essentially becomes the free end of the respective length of web 32, 33 such that the operable length of first length of web 32 extends between anchor member 13 and connector 60 and the operable length of second length of web 33 extends between anchor member 13 and connector 61. Pulling free end 64 or 65 away from its respective adjuster 56 or 57 will decrease the respective operable length of first or second length of web 32 or 33. The operable lengths of webs 32, 33 may be increased by feeding the respective free end 64, 65 into its respective adjuster 56, 57. Alternate types of adjusters, as noted and shown herein and known to those skilled in the art, are equally acceptable.

The junction member 38 is movable along the first and second lengths of web 32, 33 and relative thereto in order to vary the operable length of neck and shoulder area portions 34 and 35 between the connecting assembly 14 and junction member 38 to thereby adjust the size of permanent loop 11. It will be appreciated that as the junction member 38 is moved down each of first and second length of web 32, 33 away from the connecting assembly 14, the operable length of portions 34 and 35 will increase and in turn the operable length from the junction member 38 to respective connector 60, 61 will decrease. As a practical matter this will either be a decrease in the overall combined length of portions 40, 41, 48, 49 between the junction member 38 and the respective connector 60, 61, if no folds 42, 43 are present, or just a decrease in the length of portions 40 and 41 between junction member 38 and folds 42 and 43, if present. Similarly, the operable length between the junction member 38 and connectors 60, 61, if no folds 43, 44 are present, may be increased or reduced through the previously described operation of the web adjusters 56, 57, and the operable length between any such folds 43, 44 and the tongues 60, 61 increased or reduced through the operation of the adjusters 56, 57. Finally, the junction member 38 and the web adjusters 56, 57 may be used together in cooperation to increase or decrease any of the above described operable lengths as will be explained further herein.

It will be apparent, therefore, that the slidable movement of the junction member 38 relative to first and second lengths of web 32 and 33 simultaneously and inversely changes the operable length of the web portions above and below the junction member 38. Also noted is the ability to change the operable length of the first and second lengths of web 32, 33 through operation of the web adjusters, and the ability to use both the junction member 38 and adjusters 56, 57 to cooperatively change the various operable lengths described herein. By changing the operable length of portions 34, 35 between the connecting assembly 14 and the junction member 38, the size of permanent loop 11 is adjusted. Similarly, when the tongues 60, 61 are releasably engaged with respective buckles 29, 28 to form constructable loop 12, the size of loop 12 may be adjusted by changing the operative length of portions 40, 41, 48, 49 between junction member 38 and connectors 60, 61 as desired. Therefore, the junction member 38 and the web adjusters 28, 29 cooperate to adjust the size of loops 11, 12 and the fit of the animal restraint apparatus on the animal 24, which may for example be a dog, a cat, or other animal.

In operation, loop 11 is placed over the animal's head such that the animal's head protrudes therethrough and the connecting assembly 14 rests generally on the animal's back. The junction member 38 may then be slid toward or away from the connecting assembly to adjust the size of the permanent and adjustable loop 11 as desired. The connector tongues 60, 61 are then releasably engaged in any order with respective buckles 29, 28. For example, tongue 60 is passed under the animal's chest area, behind its front legs or forelegs, up around its ribs and releasably engaged with buckle 29. In similar fashion, tongue 61 is passed under the animal's chest area, behind its forelegs, up around its ribs and releasably engaged with buckle 28 as best seen in FIGS. 1 and 10. Constructable loop 12 is thereby formed by this releasable engagement of the connectors 60, 61 and buckles 29, 28 of connector assemblies 52, 53. The size of the constructable loop is then adjusted by operation of the web adjusters 28, 29 as described above. The first and second free ends 64, 65 may be attached to a device, such as plastic tab 240 in FIG. 19, to aid in pulling the first and second free ends through the adjusters 28, 29. As will be explained herein below, a restraint member may then be coupled to the connecting assembly 14, which in turn may be connected to any of a number of external anchorages.

Those skilled in the art will understand that the crossing relationship of the first and second lengths of web 32, 33 along with the slidability of the junction member 38 allows for the simultaneous sizing of both loops 11, 12 and provides for an adjustable fit that supports the animal while not allowing it to easily slip out of the apparatus. It is within the scope of the invention, however, for permanent loop 11 to be formed and adjusted independently of loop 12 and vice versa as would fall within the skill of those familiar with the art.

Animal restraint apparatus 10 further comprises a securement system 68 for releasably coupling together the first and second lengths of web 32, 33 generally in the area behind the animal's front legs. Referring to FIGS. 2 and 8, securement system 68 comprises a quick disconnect assembly 69 and a pair of straps 71 and 78 attached to first and second lengths of web 32, 33 by for example stitching 72, 79. Straps 71 and 78 could alternatively be attached to the first and second lengths of web in the area of and by stitching 44, 45. Quick disconnect assembly 69 comprises a female portion 70 and a male portion 73. The female portion 70 is attached to strap 71. The male portion 73 includes an adjuster portion 74, which is slidably mounted on strap 78. Female portion 70 is adapted to lockingly receive male portion 78. Pulling the loose end of strap 78 away from the male portion 78 decreases the length of web 78 and further adjusts the fit of the apparatus 110 about the animal. U.S. Pat. No. 5,084,946, the disclosure of which is incorporated herein by reference, discloses a suitable quick disconnect connector. Another example of a suitable disconnect is the TSR 100 manufactured by ITW Nexis. As seen in FIGS. 3 and 9, animal restraint apparatus 110 does not have this securement system 68. Apparatus 10 and 110 are otherwise alike in all respects.

Animal restraint apparatuses 310, 410, 510 and 610 are structurally similar and functionally identical to animal restraint apparatuses 10 and 110 as just described. To facilitate an understanding of apparatuses 310, 410, 510, 610 like numbers are used to identify the like components already described in conjunction with animal restraint apparatuses 10, 110 and the description and operation of such like components will not be repeated here. Just as is the case with animal restraint apparatus 10, animal restraint apparatuses 310 and 510 comprise securement system 68. Unlike animal restraint apparatuses 10, 310, and 510, but like animal restraint apparatus 110, animal restraint apparatuses 410 and 610 do not include a securement system 68.

The connecting assembly 314 of animal restraint apparatuses 310, 410 and the connecting assembly 514 of animal restraint apparatuses 510, 610 differ from each other and from connecting assembly 14 in several respects. Referring to FIGS. 4-7, connecting assemblies 314 and 514 comprise a single buckle 23 rather than the dual buckles 28, 29 found in connecting assembly 14. Consequently, linking web 26 is eliminated and linking web 17 is used to link together anchor members 13 and 22 by looping therethrough, and to link or attach to connecting assembly 314, 514 the buckle 23 by looping through aperture 39, thereby forming anchor member or loop 20. Buckle 23 comprises opposing apertures 25 for releasably engaging with tongues 60 and 61. The connecting assembly 514 of animal restraint apparatuses 510 and 610 further comprises anchor member or tongue 59, which is attached to the connecting assembly 514 by linking web 58, or other suitable method. Tongue 59 may comprise an integrated adjuster 55 similar to the above discussed combination tongue/adjusters 60/56, 61/57. Tongue 59 is configured for releasable coupling with one of a number of restraint members. It will be appreciated that connecting assembly 14 could further comprise anchor member or tongue 59.

Connecting assemblies 14, 314, 514 each comprise a plurality of anchor members configured for releasable coupling with any of a number of restraint members, alone or in combination. Such restraint members may comprise, for example, a tether or leash or a seat belt system, or a combination thereof. The tether or leash may be fashioned out of rope, webbing, chain, plastic, wire, or other suitable member. Examples of several suitable restraint members or tethers 90, 190, 290, 390 are illustrated in FIGS. 1 and 13-15 respectively. In any event, suitable restraint members comprise an animal restraint coupling 91, 94, 291 at one end to releasably connect the restraint member to one of the anchor members 13, 22, 20, 59. A suitable restraint member may further comprise a vehicle restraint coupling 91, 94, 291 at another end to connect the restraint member, for example, tether 90, 190, 290, 390, to an anchorage as will be described. However, a stand alone leash or tether could be connected to one of the anchor members, and the animal restrained merely by a human holding the other end, whether equipped with a vehicle restraint coupling or not. Or the other end could be tied around a tree or other anchorage. Even without connecting a restraint member to the connecting assembly, the animal may be restrained by a person directly grasping the connecting assembly 14, 314, 514, or the first or second length of web 32, 33.

Figure 14:
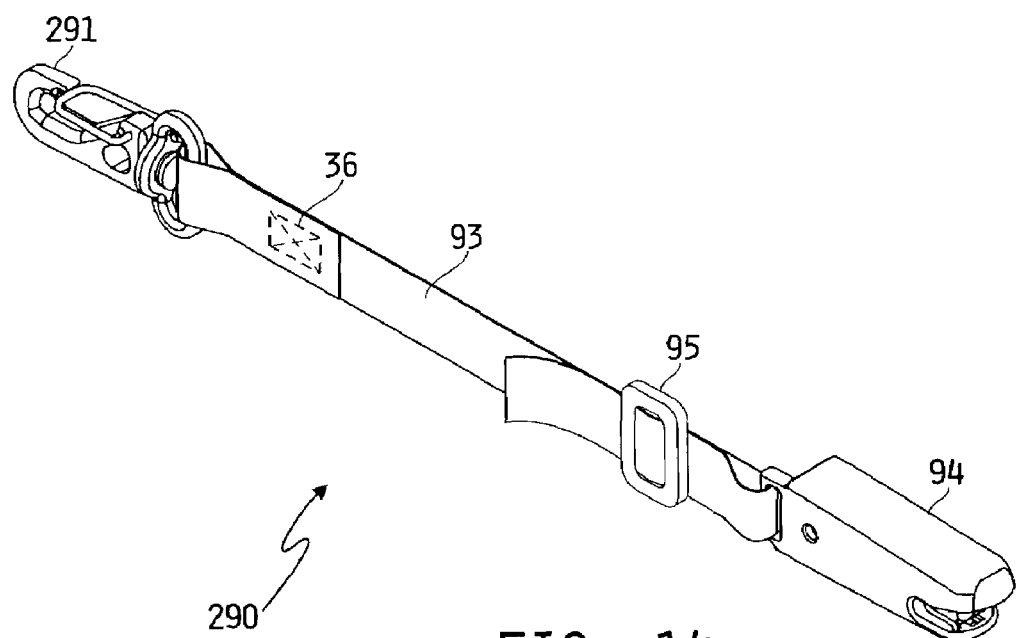
FIG. 14 is a perspective view of another animal restraint system.
Figure 15:
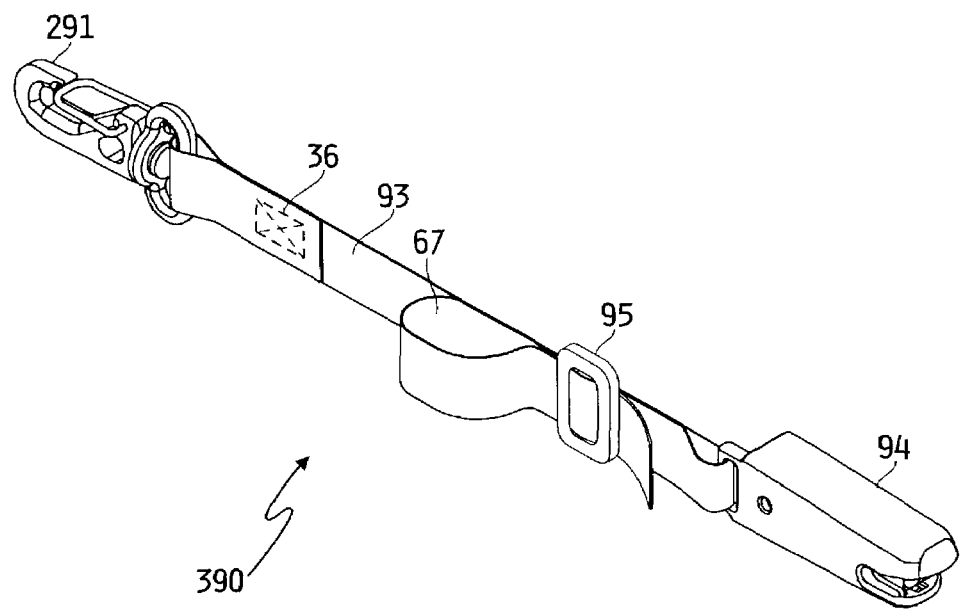
FIG. 15 is a perspective view of another animal restraint system.

Each connecting assembly 14, 314, 514 comprises D-rings 13, 22 and loop of web 20. In addition, each connecting assembly 314, 514 further comprises tongue 59, as could connecting assembly if desired. Examples of animal restraint couplings suitable for releasably coupling with D-rings 13, 22 and loop of web 20 include a snap hook 91 (FIG. 12) and a swivel snap hook or swivel hook 291 (FIG. 14). FIGS. 1 and 17 depict a snap hook 91, which illustratively may meet the requirements of FMVSS 213, releasably coupled with D-ring 22. It will be appreciated that swivel hook 291 could replace snap hook 91 in FIGS. 1 and 17, and that the hooks 91, 291 could be coupled to D-ring 13, to and through loop of web 20, and even could be releasably coupled with one of the linking webs 17, 26. Other suitable couplings known in the art may also be used. For example, a mini-connector 94 (FIG. 11) of the type disclosed in commonly owned U.S. Pat. No. 6,962,394 issued to Anthony et al. on Nov. 8, 2005, the disclosure of which is incorporated herein by reference, may be suitable. Such a mini-connector comprises a coupling having a stop member configured to normally resist movement of a lever from a normally closed position to an open position, the open position allowing disconnection from the anchorage. Also, a restraint member may be directly tied to one of the anchor members 13, 20, 22. An animal restraint coupling comprising a buckle 191 (FIG. 14) configured to releasably engage tongue 59 would be suitable for releasably coupling with tongue 59.

Figure 12:
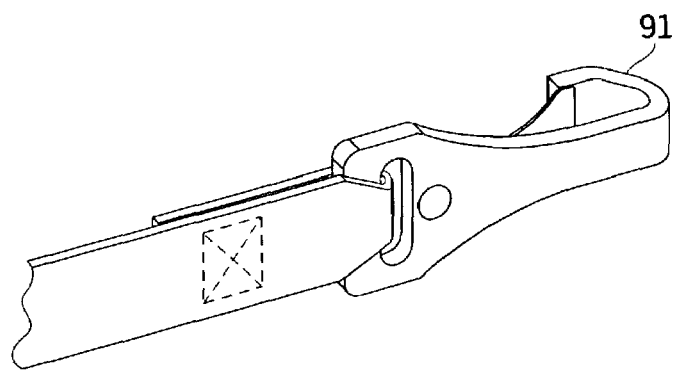
FIG. 12 depicts an illustrative connector for use in the illustrative animal restraint systems.
Figure 13:
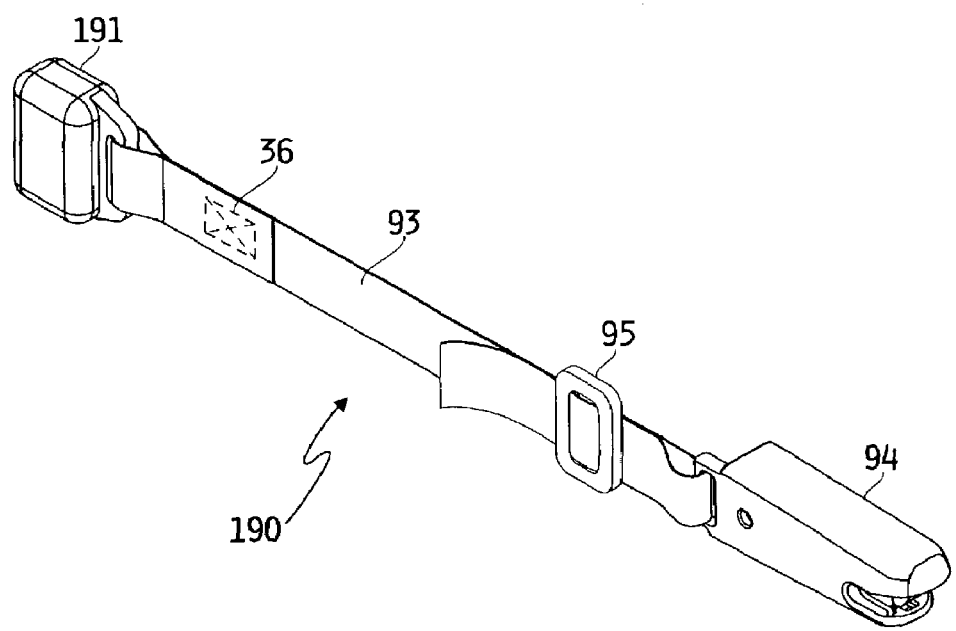
FIG. 13 is a perspective view of another animal restraint system.

As best seen in FIG. 1, tether system 90 comprises animal restraint coupling 91, a tether web 93, a web adjuster 95, and a vehicle restraint coupling 94. Illustrative coupling 91, also depicted in FIG. 12, is a snap hook and could be a specialized type of snap hook called a swivel hook 291 seen in FIG. 14. Indeed, tether system 290 (FIG. 14) is substantially similar in structure, substituting the swivel hook 291 for the snap hook 91, and functions in an identical manner as will now be described. Tether system 90, 290 is releasably coupled to anchor member 22 or 13 through animal restraint coupling 91 and then releasably connected to an anchorage 99 through vehicle restraint coupling 94. Illustratively, anchorage 99 is a round bar meeting the requirements of FMVSS 225 and is rigidly attached to a vehicle between seat 97 and seat back 98 of the vehicle. Adjuster 95 may be used to adjust the length of the tether web or belt 93. Tether system 190 is identical in structure and operation except that it comprises animal restraint coupling, or buckle 191 for releasably coupling with tongue 59, but otherwise operates as just described.

It will be appreciated that couplings 91, 94 and 291 are interchangeable such that tether system 90, 290 may be configured at both ends with coupling 91 or 291, may be configured at both ends with coupling 94, or may be configured with coupling 91 or 291 proximate to the seat 97 and engageable with anchorage 99 and with coupling 94 proximate to the animal restraint apparatus 10, 110 and engageable with anchor member 22. It will also be appreciated that other connectors may be used. For example the tongue 59 and buckle 191 combination described above with respect to tether system 190. As noted the tether system 90, 190, 290, as can tether system 390 described below, may be released from anchorage 99 and used as a leash, for example to walk the animal.

In the event that the vehicle does not have a round bar 99, or in the event the animal is too big to be retained by the round bar the restraint member and anchorage may be a vehicle safety belt system 100 (FIG. 10). Such a seat belt system 100 would have a third length of web or belt 96 secured to the vehicle at one end (not shown) and comprising a tongue 101 at the other end to releasably engage an anchorage or buckle 102 attached to the vehicle. The seat belt tongue 101 is passed through anchor member loop 20 and releasably engaged or coupled with seat belt buckle 102 to releasably couple the connecting assembly 14, 314, 514 to the restraint member 100, which is slidingly received through loop of web 20 thereby connecting the animal restraint apparatus to the vehicle. Similarly, an anchorage web 62 comprising a loop of web 66 secured by stitching 36 and an anchorage or D-ring 63 is provided for use with the vehicle's seat belt system 100 (FIG. 10). The seat belt tongue 101 is received through the loop of web 66 and then releasably engaged with the seat belt buckle 102 to secure the anchorage web 62. Thereafter, the vehicle restraint coupling 91, 94 (FIG. 11), 291 of the tether system 90 is releasably coupled with the D-ring 63. So too, tether system 390, which comprises loop of web 67, adjuster 95, and interchangeable couplings 94 and 291, may be releasably coupled to connecting assembly 14, 314, 514 by either coupling 94, 291, and connected to the vehicle by passing tongue 101 through loop 67 and engaging anchorage buckle 102. The coupling 94 or 291 could also directly couple with anchorage 99 if available without the need to use the loop 67 as just described, or in conjunction therewith. It will be appreciated that tether system 190 could also comprise loop of web 67 for use as just described. Also, tether system 190 could use coupling 191 as a vehicle restraint coupling to couple with the seat belt tongue 101 and the coupling 94 as an animal restraint coupling to releasably couple with connecting assembly 14, 314, 514. Thus, those skilled in the art will recognize that the various couplings 91, 94, 191, 291 are interchangeable as either or both animal restraint couplings and/or vehicle restraint couplings.

Figure 16:
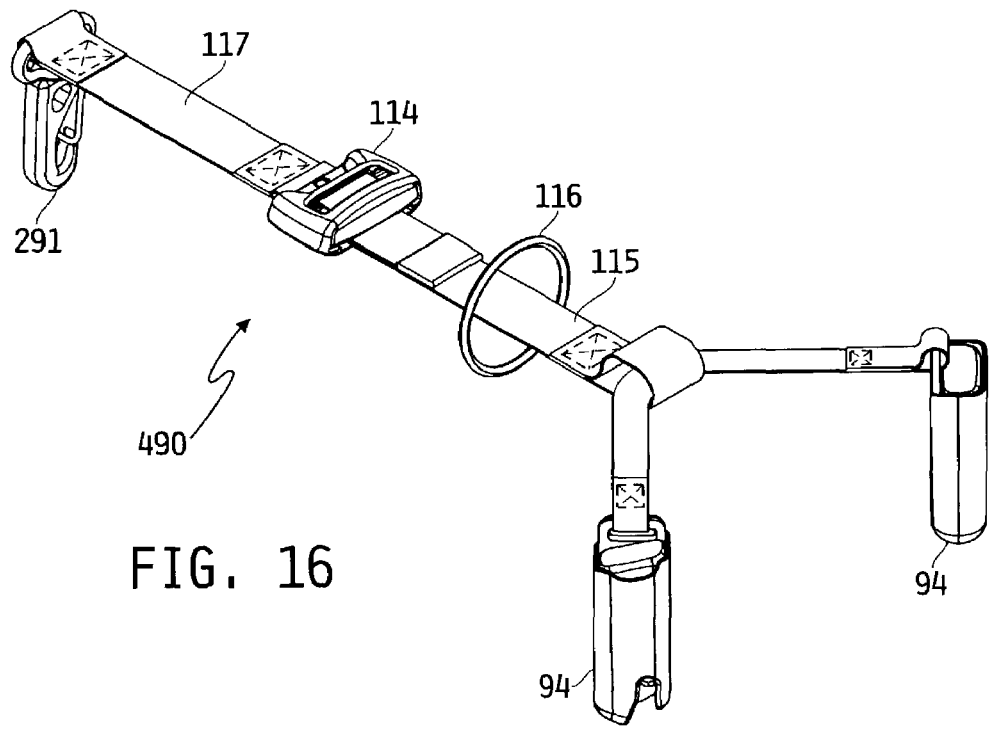
FIG. 16 is a perspective view of another animal restraint system.

Another illustrative embodiment of a third length of web 117 being utilized as an anchorage is depicted in FIG. 16. Tether or anchorage system 490 comprises third length of web 117 comprising one end having a first vehicle coupling 291 affixed by for example stitching 36, a second vehicle coupling 94 affixed by for example stitching 36 to another end, and a web adjuster 114 and a tether mounting member 116 each slidingly mounted to the third length of web 117 between the first and second vehicle couplings 291, 94. In the alternative, the third length of web 117 may be formed two web segments 117 and 115 linked together by web adjuster 114. Tether mounting member 116 illustratively may be a ring, or D-ring made of metallic, non-metallic or composite materials. It will be appreciated that tether mounting member 116 may also be mounted on third length of web 117 in a fixed position. As seen in FIG. 16, the other end may further comprise a third vehicle coupling 94. In operation, vehicle coupling 291 is releasably connected to an upper tether mount (not shown) as defined in FMVSS 225 and the second vehicle coupling 94 is releasably connected to a lower anchorage as may also be defined by FMVSS 225, such as round bar 99 (FIG. 1). If the third vehicle coupling 94 is provided, then it is releasably connected to a second round bar (not shown) spaced apart from the first. When connected as just described, the tether anchorage system 490 is disposed in a generally vertical orientation in relation to the seat back 98 (FIG. 1) and floor of the vehicle. In operation a suitable restraint member, such as the described tether system 90, 190, 290, or 390, is coupled at one end via its animal restraint coupling to connecting assembly 14, 314, or 514, and at the other end via its vehicle restraint coupling to the tether mounting member 116.

Yet another illustrative embodiment of a third length of web 111 being utilized as an anchorage is depicted in FIG. 17. Tether or anchorage system 590 comprises third length of web 111 comprising one end having a first vehicle coupling 112 affixed to one end by for example stitching, a second vehicle coupling (not shown) affixed to another end, and a web adjuster 114 and a tether mounting member 116 each slidingly mounted to the third length of web 111 between the first and second vehicle couplings 112. Tether mounting member 116 illustratively may be a ring, or D-ring made of metallic, non-metallic or composite materials. It will be appreciated that tether mounting member 116 may also be mounted on third length of web 111 in a fixed position. For example, a web segment (not shown) may be stitched to third length of web 111 with mounting member 116 sandwiched therebetween. In operation, first and second vehicle couplings 112 are each releasably connected to one of a plurality of anchorages 118 rigidly secured to the vehicle. Anchorages 118 may for example be any suitable metallic anchor point on a pick-up truck, or an SUV, etc. The web adjuster 114 may be used to adjust the fit of the third length of web 111. When connected as just described, the tether anchorage system 590 is disposed in a generally horizontal orientation in relation to the seat back 98 (FIG. 1) and floor of the vehicle. In operation a suitable restraint member, such as the described tether system 90, 190, 290, or 390, is coupled at one end via its animal restraint coupling to connecting assembly 14, 314, or 514, and at the other end via its vehicle restraint coupling to the tether mounting member 116.

Figure 18:
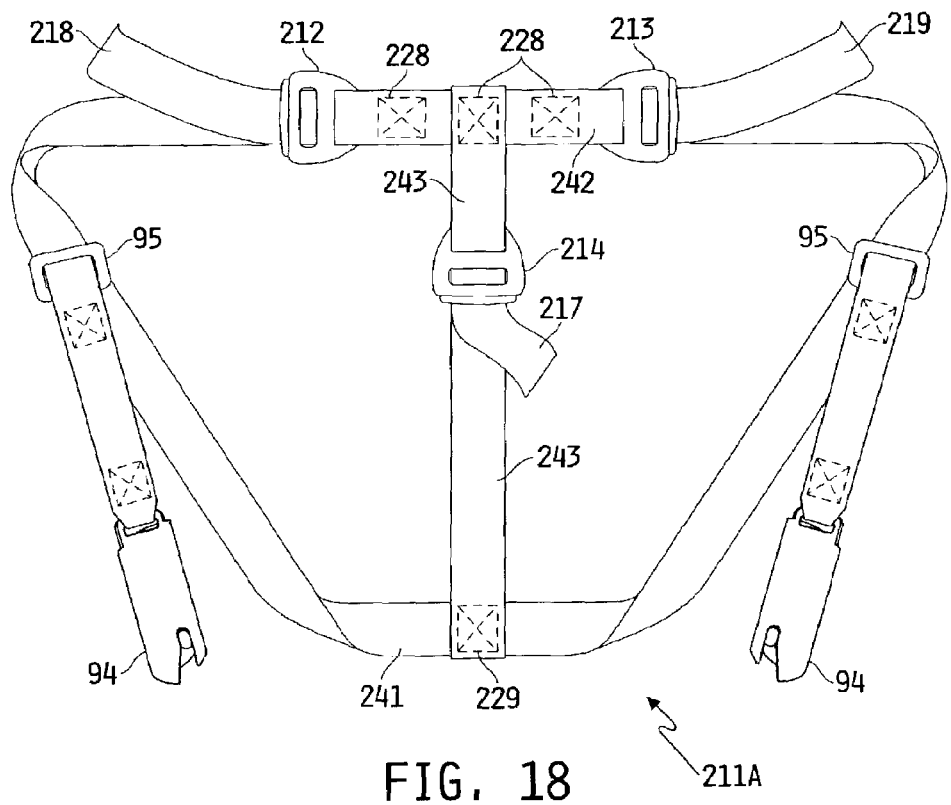
FIG. 18 is a top plan view of another illustrative embodiment of an animal restraint system.
Figure 19:
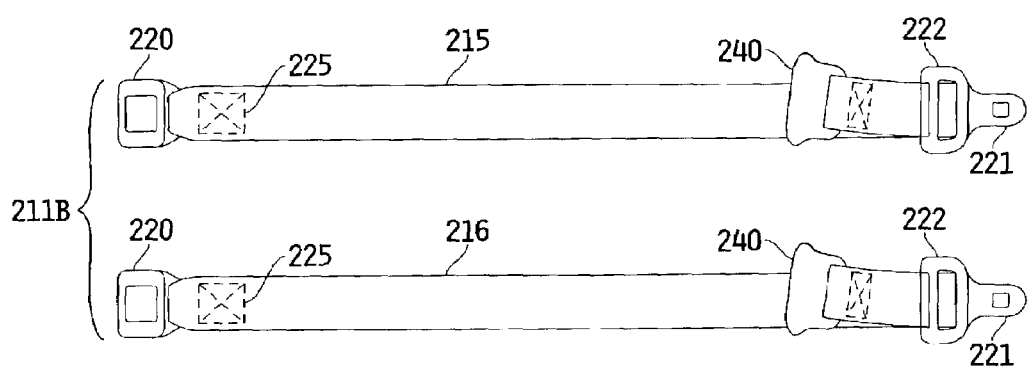
FIG. 19 is a top view of another illustrative embodiment of an animal restraint system.
Figure 20:
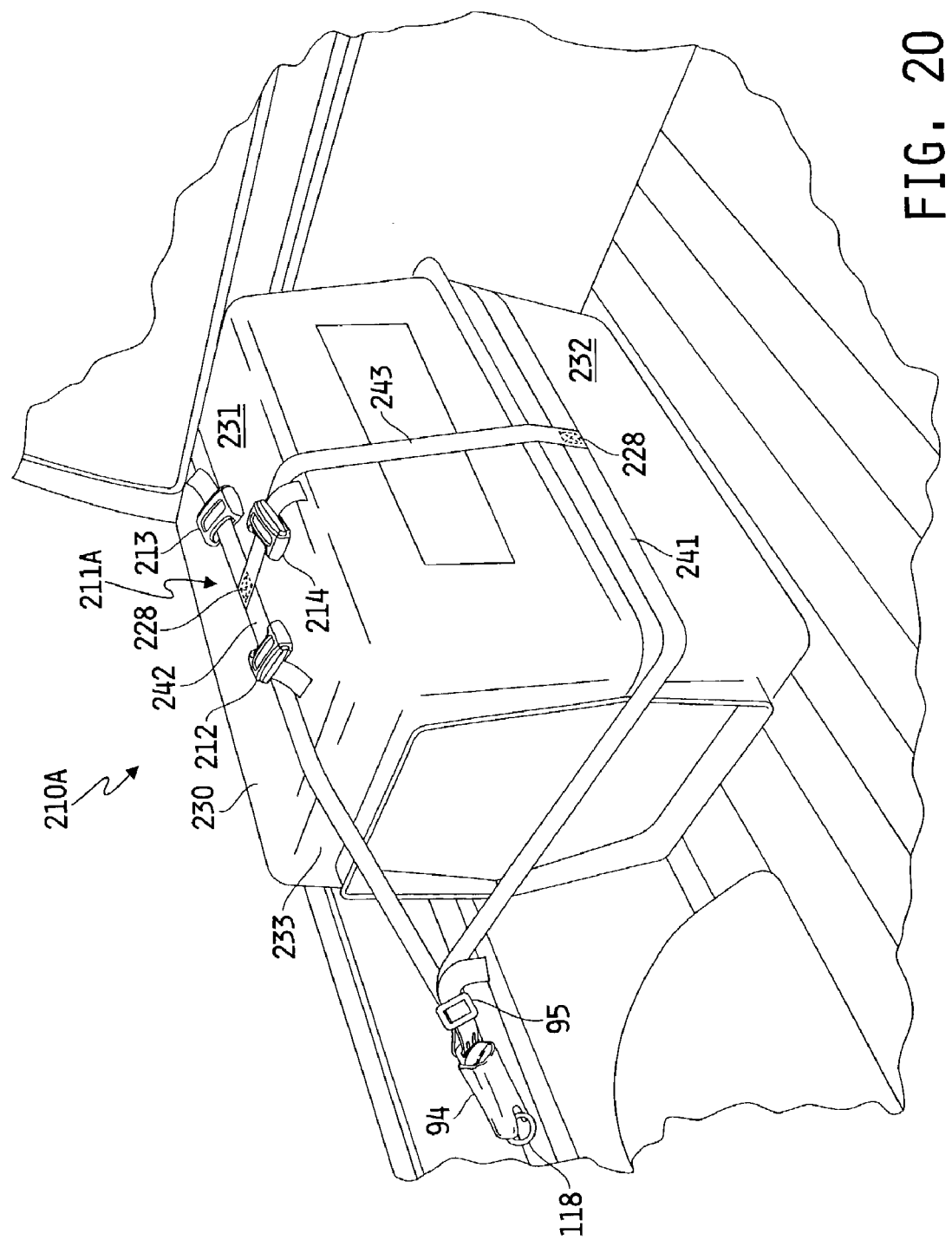
FIG. 20 is a partial perspective view of a kennel secured to a vehicle by the illustrative embodiment of FIG. 18.
Figure 21:
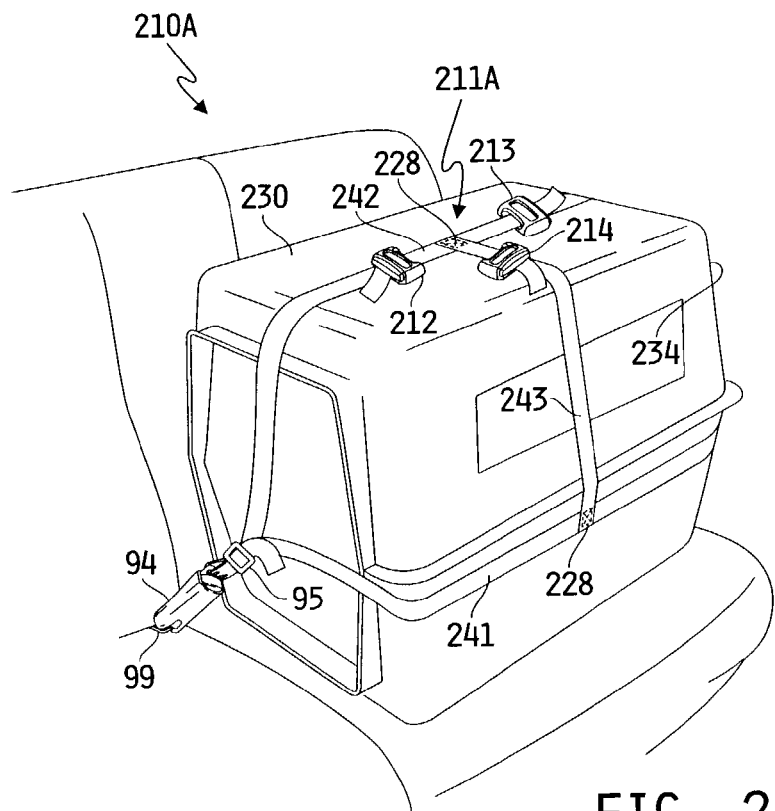
FIG. 21 is a partial perspective view of a kennel secured to another vehicle by the illustrative embodiment of FIG. 18.

FIGS. 18-22 depict further illustrative embodiments 210A and 210B. Referring to FIGS. 18, 20, and 21, animal restraint apparatus 210A comprises container restraint system 211 A and container 230, which may be for example a conventional kennel. For example, the container 230 may comprise a pair of spaced apart side surfaces 232, sandwiched between and perpendicular to spaced apart top and bottom surfaces 231, and spaced apart front and back surfaces 233, 234. Container restraint system 211A comprises a first length of web 241, a second length of web 242, and a third length of web 243. First length of web 241 comprises a first end 218, a second end 219 and a pair of web adjusters 212, 213 slidingly mounted thereon. Web adjusters 212 and 213 are linked together by a second length of web 242 by for example stitching and web 241 is slidingly threaded through web adjuster 212, through a pair of slides or adjusters 95 and through web adjuster 213 thus generally forming an endless loop. A third web adjuster 214 is slidingly mounted at one end to third length of web 243 and fixedly mounted at the other end to fourth length of web 244. A first web segment 243 is generally perpendicular to and attached at one end to first length of web 241 by for example stitching 229, with the other end 217 slidingly received through web adjuster 214. A second web segment 244 is generally perpendicular to and attached to second length of web 242. Together, then, first and second web segments 243 and 244 in conjunction with adjuster 214 form a third length of web to link together first and second lengths of web 241 and 242. First and second vehicle coupling devices 94 are attached to slider/adjusters 94, either slidingly or by stitching or other suitable method. First and second vehicle coupling devices are each configured to releasably engage with or couple to one of a number of anchorages attached to a vehicle. The anchorages may comprise round bars 99 (FIG. 21), for example, or other suitable anchorage such as vehicle anchorages 118 (FIG. 20), rigidly attached to a vehicle.

In operation, the container 230 may be placed in any vehicle having some form of anchorage, for example round bars 99 or vehicle anchorages 118. The round bars may comply with FMVSS 225. The container restraint apparatus 211A is then placed on top 231 of the container such that the second length of web 242 and adjusters 212 and 213 are laying on the top 231 of the container 230. The vehicle couplings 94, which may be mini-connectors as defined herein, are releasably engaged with respective anchorages 99, 118 to secure the container to the vehicle. Ends 217, 218, 219 may be pulled to adjust the fit of the container restraint apparatus 211A. When so mounted, the first length of web 241 wraps around at least one side 232 of the container. Also, portions of first length of web 241 and web segments 242, 243, and 244 wrap around a portion of the top 231. Portions of web 243 also may wrap around a portion of side 232.

It will be appreciated that container restraint apparatus 211A, as shown in FIG. 20, may alternatively comprise a first length of web 241 comprising first vehicle coupling 94 and adjuster 95 on one end and second vehicle coupling 94 and adjuster 95 on the other end (not shown). When this first length of web 241 is wrapped around at least one side 232 of the container 230 and the couplings 94 engaged with anchorages 99 or 118, the container is secured to the vehicle. The fit may be adjusted with adjusters 95. If desired, a second length of web may then extend over the top 231 of the container between the two couplings 94 and may further comprise one or more web adjusters 212, 213 to adjust the fit. Finally, a third length of web 243 and web adjuster 243 may be added and may extend between and perpendicular to the first and second lengths of web to further secure the container 230 to the vehicle.

For example, FIG. 20 shows engagement with anchorages 118 in a pick up truck and FIG. 21 illustratively shows engagement with round bars 99 in the back seat of a car, van, mini-van, bus, SUV, or other vehicle. Not shown, but contemplated by the invention is mounting via anchorages 118, or other suitable anchorage, in the cargo area of an SUV or van, or seat or cargo area of a boat, train, air plane or other vehicle.

Figure 22:
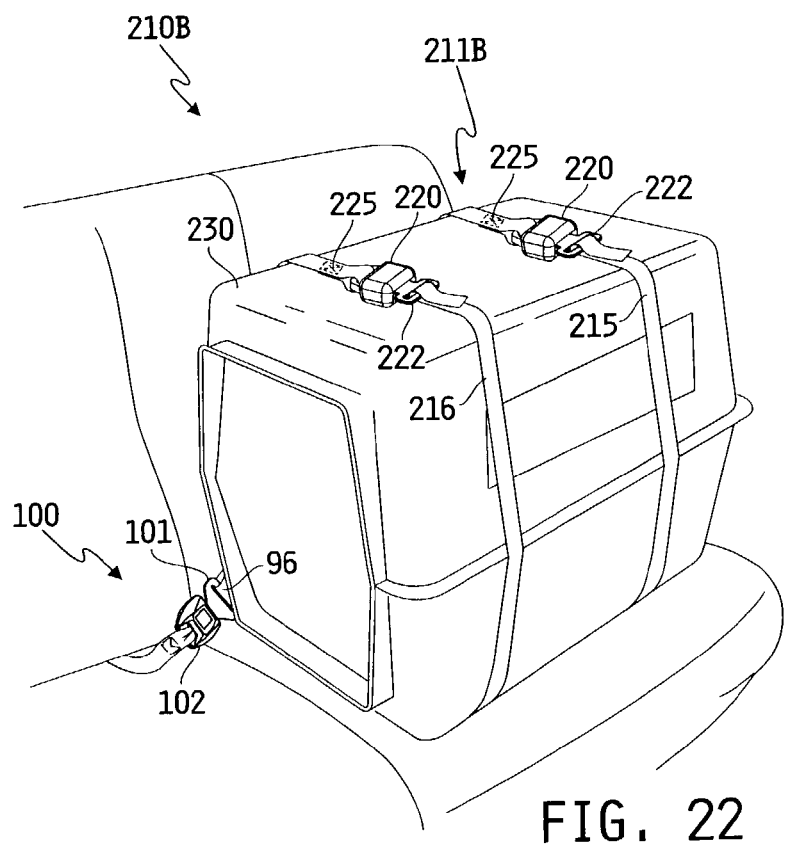
FIG. 22 is a partial perspective view of a kennel secured to a vehicle by the illustrative embodiment of FIG. 119.

As shown illustratively in FIGS. 19 and 22, animal restraint apparatus 210B comprises container restraint system 211B and container 230, which may be for example a conventional kennel. Container restraint system 211B comprises a first length of web 215 and a second length of web 216. Each of first and second lengths of web 215, 216 comprise a first end having a first coupling device, illustratively tongue 221, and a second end having a second coupling device, illustratively buckle 220. Buckle 220 is attached to web 215, 216 by for example stitching 225 of other suitable method. Illustratively, tongue 221 comprises web adjuster 222, which is slidingly mounted to the web 215, 216. The web 215, 216 may also comprise plastic pull tab 240 as described herein. As depicted in FIG. 22, the vehicle's seat belt system 100 is used as an anchorage to couple with the container restraint system 211B. In operation, the seat belt tongue 101 and buckle 102 are releasably engaged and the first and second lengths of web 215, 216 are looped through the seat belt 96, which is attached at one end (not shown) to the vehicle and at the other end to the vehicle via the engaged tongue 101 and belt 102. The container 230 is then placed on top of the webs 215, 216, which may be spaced apart from one another. Then the tongue 221 and buckle 220 are releasably engaged such that the webs 215, 216 wrap around the periphery of the container 230 such that the webs wrap around spaced apart top and bottom surfaces 231, and the spaced apart side surfaces 232 of container 230. The webs 215, 216 may then be tightened down by web adjusters 222. The container 230 need not have a top surface 231. Those skilled in the art will realize that webs 215 and 216 may be wrapped around the periphery in spaced apart relation one to the other, adjacent to one another, adjoining one another, one on top of the other, or in crossing relationship to each other. Also, a single web 215 or 216 may be used to secure the container 230 to the vehicle as just described, or three or more webs could be used to secure the container as just described. In addition, container restraint apparatus 211A may be used in conjunction with container restraint apparatus 211B to secure the container to a vehicle.

The size of animal restraint apparatuses 210A and 210B are adjustable to accommodate different size containers 230, and may be configured with different size coupling devices 94, 220, 221 as appropriate. For example, container restraint apparatuses 211A and 211B can be configured for use with containers have such dimensions as 24"×16"×15" (60.9 cm×40.6 cm×38.1 cm), and 32"×23"×23" (81.2 cm×58.4 cm×58.4 cm). Container restraint apparatus 211A may further be configured for use with containers having such dimensions as 40"×27"×30" (101.6 cm×68.5 cm×76.2 cm). Stitching or other suitable connections as described above and below may be used. Also, the container 230 may be secured to the vehicle with or without an animal inside. And an animal may be placed inside the container 230 even after it is secured to the vehicle.

It will be appreciated that any connections herein accomplished by stitching 15, 16, 36, 37, 44, 45, 72, 79, 225, 228, 229 may also be accomplished by other means such as, for example, heat seal, rivets, tacks, staples, snaps, hook and pile, glue, cement, alone or in combination with stitching or any of the above. Any adjusters disclosed herein may for example be of the type disclosed in co-owned U.S. Pat. No. 6,425,632 issued to Anthony et al. on Jul. 30, 2002, the disclosure of which is incorporated herein by reference, or may be conventional tri-slides. Although anchor members 13 and 22 have been depicted and described as D-rings, other suitable junctions exist and may be used. Although separate in-line and combination adjusters are shown and described in various places, the use of such in-line or combination connectors and adjusters are interchangeable within the scope of the invention, and any combination of combination and in-line adjusters may be used.

The animal restraint apparatuses described herein above may utilize web belts or straps of a quality that may be found in automobile seatbelt systems used for human beings. For example, although the webs that comprise the described apparatuses may be constructed from any suitable lightweight material possessing sufficient strength and energy management properties suitable for safely restraining an animal, they may also be constructed from suitable material for safely restraining a human. In any event, therefore, the webs may be constructed from nylon, polyester, polypropylene, cotton, or any combination thereof. The webbing used in the illustrative animal restraint apparatuses may be about 1.5 inches wide, although other widths, for example from one to four inches wide, fall within the scope of the invention. The illustrative tethers may range from about one inch to three inches wide and may range in length from 10 to 45 inches, although other lengths fall within the scope of the invention. In addition, each of the connectors, couplers, anchor members, anchorages and mounting members described herein may be or may comprise components suitable for commercial use in restraint systems designed for human beings. Each of the animal restraint apparatuses are adjustable and may be sized to fit any number of animals and vehicles.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An animal restraint apparatus comprising:
    a connecting assembly configured for coupling to a restraint member apart from the connecting assembly;
    a first length of web extending from the connecting assembly;
    a second length of web extending from the connecting assembly; and
    a junction member receiving each of the first and second lengths of web therethrough in crossing relationship, the first and second lengths of web defining an adjustable loop between the connecting assembly and the junction member.

2. The animal restraint apparatus of claim 1 wherein the first length of web has a first free end and the second length of web has a second free end and wherein each of the first and second lengths of web comprises a connector for releasably connecting the first and second ends to the connecting assembly.

3. The animal restraint apparatus of claim 2 wherein the connecting assembly comprises at least one buckle and wherein each of the connectors comprises a tongue for releasably engaging the at least one buckle to form a constructable loop between the connecting assembly and the crossing point of the first and second lengths of web.

4. The animal restraint apparatus of claim 3 further comprising:
    a first web adjuster slidingly mounted to the first length of web, and
    a second web adjuster slidingly mounted to the second length of web, the first and second web adjusters operable to adjust the length of the first and second lengths of web between the respective connectors and the connecting assembly.

5. The animal restraint apparatus of claim 4 wherein the junction member is disposed between the constructable and adjustable loops in opposing relationship to the connecting assembly.

6. The animal restraint apparatus of claim 5 wherein the first and second lengths of web are slidingly received through the junction member, the junction member being movable relative to the first and second lengths of web to adjust the size of the adjustable loop.

7. The animal restraint apparatus of claim 6, wherein movement of the junction member relative to the first and second lengths of web adjusts the size of the constructable loop when the connectors are releasably engaged with the at least one buckle.

8. The animal restraint apparatus of claim 6, wherein movement of the junction member relative to the first and second lengths of web in cooperation with operation of the first and second web adjusters when the connectors are releasably engaged with the at least one buckle sizes the animal restraint apparatus.

9. The animal restraint apparatus of claim 5 wherein each of the first and second lengths of web comprises permanent folds located between the junction member and the respective connectors for angularly redirecting the first and second lengths of web thereat.

10. The animal restraint apparatus of claim 9 further comprising a strap configured to releasably couple together the first and second lengths of web.

11. The animal restraint apparatus of claim 1 wherein the connecting assembly comprises at least one anchor member configured to releasably couple with the restraint member.

12. The animal restraint apparatus of claim 11 wherein the at least one anchor member is a d-ring.

13. The animal restraint apparatus of claim 11 wherein the at least one anchor member is a loop of web.

14. The animal restraint apparatus of claim 11 wherein the at least one anchor member is a tongue.

15. The animal restraint apparatus of claim 11 wherein the restraint member comprises a tether for releasably coupling with the anchor member.

16. The animal restraint apparatus of claim 15 wherein the tether comprises an animal restraint coupling at one end to releasably connect the tether to the at least one anchor member.

17. The animal restraint apparatus of claim 16 wherein the animal restraint coupling comprises a snap hook.

18. The animal restraint apparatus of claim 17 wherein the snap hook comprises a swivel hook.

19. The animal restraint apparatus of claim 16 wherein the animal restraint coupling comprises a buckle.

20. The animal restraint apparatus of claim 16 wherein the tether further comprises a vehicle restraint coupling at an end opposite the one end to releasably connect the tether to an anchorage.

21. The animal restraint apparatus of claim 20 wherein the vehicle restraint coupling comprises a snap hook.

22. The animal restraint apparatus of claim 21 wherein the snap hook comprises a swivel hook.

23. The animal restraint apparatus of claim 20 wherein the vehicle restraint coupling comprises a tongue configured to releasably engage a seat belt buckle attached to a vehicle.

24. The animal restraint apparatus of claim 20 wherein the vehicle restraint coupling comprises a coupling having a stop member configured to normally resist movement of a lever from a normally closed position to an open position, the open position allowing disconnection from the anchorage.

25. The animal restraint apparatus of claim 20 wherein the vehicle restraint coupling comprises a loop of web configured to receive therethrough a seat belt attached to a vehicle.

26. The animal restraint apparatus of claim 25 wherein the vehicle restraint coupling further comprises a coupling having a stop member configured to normally resist movement of a lever from a normally closed position to an open position, the open position allowing disconnection from the anchorage.

27. The animal restraint apparatus of claim 20 wherein the characteristics of the anchorage are substantially defined by Federal Motor Vehicle Safety Standard (FMVSS) 225.

28. The animal restraint apparatus of claim 27 wherein the anchorage comprises a round-bar.

29. The animal restraint apparatus of claim 28 wherein the anchorage comprises an upper tether anchorage.

30. The animal restraint apparatus of claim 20 wherein the anchorage comprises a third length of web.

31. The animal restraint apparatus of claim 30 wherein the third length of web comprises
 a first end comprising a loop configured to receive therethrough a seat belt attached to a vehicle, and
 a second end comprising an attachment member configured to couple with the vehicle restraint coupling.

32. The animal restraint apparatus of claim 30 wherein the third length of web comprises
 a first end comprising a first vehicle coupling configured to connect to a first vehicle anchorage,
 a second end comprising a second vehicle coupling configured to connect to a second vehicle anchorage, and
 a tether mounting member slidingly mounted on the anchorage web between the first and second vehicle couplings and configured to couple with the vehicle restraint coupling.

33. The animal restraint apparatus of claim 32 wherein the third length of web is connected to the first and second vehicle anchorages in a generally vertical orientation therebetween.

34. The animal restraint apparatus of claim 32 wherein the third length of web is connected to the first and second vehicle anchorages in a generally horizontal orientation therebetween, and wherein the tether mounting member is fixedly secured to the third length of web.

35. The animal restraint apparatus of claim 20 wherein the anchorage comprises a seat belt system attached to a vehicle, the seat belt system comprising a belt, a tongue and a buckle wherein the tongue is attached to the belt and is releasably engageable with the buckle.

36. The animal restraint apparatus of claim 20 wherein the anchorage comprises a seat belt buckle attached to a vehicle.

37. The animal restraint apparatus of claim 15 wherein the tether comprises a leash.

38. The animal restraint apparatus of claim 11 wherein the restraint member comprises a seat belt system installed in a vehicle.

39. The animal restraint apparatus of claim 1 wherein the connecting assembly comprises a plurality of anchor members configured to mount the animal restraint apparatus to a vehicle.

40. The animal restraint apparatus of claim 39 wherein at least one of the plurality of anchor members comprises a D-ring.

41. The animal restraint apparatus of claim 39 wherein at least one of the plurality of anchor members further comprises a loop of web.

42. The animal restraint apparatus of claim 41 wherein the plurality of anchor members further comprises a tongue.

43. An animal restraint apparatus comprising:
 a connecting assembly configured for coupling to a restraint member apart from the connecting assembly, the connecting assembly having a first connecting member extending from a first side thereof and a second connecting member extending from a second side of the connecting assembly opposite the first side;
 a first length of web extending from the first side of the connecting assembly and having a first free end releasably connectable to the second connecting member;
 a second length of web extending from the second side of the connecting assembly and having a second free end releasably connectable to the first connecting member;
 wherein the restraint apparatus is configured to be secured to an animal with the first and second free ends releasably connected to the connecting assembly.

44. The animal restraint apparatus of claim 43 further comprising
a junction member,
wherein the first and second lengths of web are slidingly received through the junction member in crossing relationship to define a permanent loop between the junction member and the connecting assembly, the junction member being movable relative to the first and second lengths of web,
wherein the first free end further comprises a first connector slidingly mounted thereto and configured to adjust the length of the web between the first connector and the connecting assembly,
wherein the second free end further comprises a second connector slidingly mounted thereto and configured to adjust the length of the web between the second connector and the connecting assembly,
wherein the connecting assembly further comprises a plurality of anchor members configured to releasably couple to the restraint member and a buckle, the buckle comprising said first connecting member and said second connecting member, said first connecting member configured to releasably connect to the second connector and said second connecting member configured to releasably connect to the first connector to form a constructable loop,
wherein the junction member and the first and second connectors cooperate to size the animal restraint apparatus on the animal when the first and second connectors are releasably connected to the buckle.

45. The animal restraint apparatus of claim 44 wherein the plurality of anchor members comprise a d-ring and a loop.

46. The animal restraint apparatus of claim 45 wherein the plurality of anchor members further comprise a tongue.

47. The animal restraint apparatus of claim 45 further comprising a strap configured to releasably couple together the first and second lengths of web.

48. The animal restraint apparatus of claim 45 wherein the connecting assembly further comprises a second buckle configured to releasably connect to the first connector and wherein first said buckle is configured to releasably connect to the second connector.

* * * * *